United States Patent
Eskin

(10) Patent No.: US 11,902,638 B1
(45) Date of Patent: Feb. 13, 2024

(54) GAPLESS DETECTOR MOSAIC IMAGING SYSTEMS AND METHODS

(71) Applicant: Ball Aerospace & Technologies Corp., Boulder, CO (US)

(72) Inventor: Joshua Eskin, Erie, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 170 days.

(21) Appl. No.: 17/565,700

(22) Filed: Dec. 30, 2021

Related U.S. Application Data

(60) Provisional application No. 63/132,014, filed on Dec. 30, 2020.

(51) Int. Cl.
*H04N 23/45* (2023.01)
*H04N 23/80* (2023.01)
*G03B 17/17* (2021.01)

(52) U.S. Cl.
CPC ............. *H04N 23/45* (2023.01); *G03B 17/17* (2013.01); *H04N 23/80* (2023.01)

(58) Field of Classification Search
CPC ........ H04N 23/45; H04N 23/55; H04N 25/48; H04N 23/80; H04N 13/296; G03B 17/17; G02B 27/0025
See application file for complete search history.

(56) References Cited

U.S. PATENT DOCUMENTS

| | | |
|---|---|---|
| 6,137,535 A | 10/2000 | Meyers |
| 6,734,966 B2 | 5/2004 | McCarthy |
| 7,587,109 B1 | 9/2009 | Reininger |
| 8,619,368 B2 | 12/2013 | Tocci |
| 10,070,055 B2 * | 9/2018 | Shepard .................... G01J 3/12 |
| 10,091,439 B2 | 10/2018 | Hogasten et al. |
| 10,095,015 B2 | 10/2018 | Chiarini et al. |
| 10,382,700 B1 * | 8/2019 | Dragavon .............. H04N 25/48 |
| 11,095,868 B1 * | 8/2021 | Rodriguez ........... H04N 13/296 |
| 2007/0188610 A1 | 8/2007 | Micotto et al. |
| 2009/0268983 A1 | 10/2009 | Stone et al. |
| 2010/0295984 A1 * | 11/2010 | Neidrich ................ H04N 23/55 |
| | | 359/290 |
| 2011/0228142 A1 * | 9/2011 | Brueckner ......... G02B 27/0025 |
| | | 348/E5.079 |
| 2014/0110585 A1 | 4/2014 | Justice |
| 2017/0214861 A1 * | 7/2017 | Rachlin .................. G03B 15/00 |

OTHER PUBLICATIONS

"TESS and PLATO at a glance," PLATO Science Management Office, Mar. 3, 2019, 2 pages.

* cited by examiner

*Primary Examiner* — Hung H Lam
(74) *Attorney, Agent, or Firm* — Sheridan Ross P.C.

(57) ABSTRACT

Imaging systems and methods that enable multiple detectors to be used to capture multiple component images that can be fused to create a composite image of a scene, without introducing gaps in that composite image in areas corresponding to the boundaries of the detectors, are provided. The system includes imaging optics, such as a telescope, that at least in part define an optical path extending between an exit pupil and a focal plane. Field segmentation optics are located within the optical path, to create multiple, partially overlapping component images. At least one detector is provided to produce an image signal representing each of the component images. A composite image is then formed by registering and fusing the component images.

21 Claims, 23 Drawing Sheets

GAPLESS DETECTOR MOSAIC IMAGING SYSTEMS AND METHODS

CROSS-REFERENCE TO RELATED APPLICATIONS

This application claims the benefit of U.S. Provisional Patent Application Ser. No. 63/132,014, filed Dec. 30, 2020, the entire disclosure of which is hereby incorporated herein by reference.

FIELD

Systems and methods for forming images using multiple detector arrays are provided. More particular, systems and methods for forming images using multiple detector arrays, without suffering the effects of gaps introduced in areas between adjacent detector arrays, are provided.

BACKGROUND

In the broad field of optical imaging, light emanating from objects of interest is projected onto a focal plane by imaging optics. The light may be ordinary visible light, infrared, or other, such as ultraviolet or even radio waves. The imaging optics may consist of lenses, mirrors, or other combinations, including diffractive optics. In most situations, a detector array serves as the light-sensing element in the imaging system. This detector array typically consists of a light-sensing material, usually a semiconductor, which is divided into a number of picture elements, or pixels, each of which senses the light falling locally on a small area. Imaging systems can also utilize photographic film or any other 'staring' type detector array.

The total number of pixels available in any single detector array is often a limiting factor in the design of an imaging system that provides the desired amount of image information or resolution. Also, in telescope applications, the physical size of the detector array, and in particular the area of the detector array, can also be a limiting factor. In particular, a single detector having a desired minimum physical area and resolution may not be available, or may be cost prohibitive. A common solution is to place a number of detector arrays at the focal plane of the optics, forming a "mosaic" detector in which the individual detector arrays together provide multiple times more pixels than can be achieved with any single detector array. But mosaics come at the cost of gaps between the individual detector arrays or array modules, since there must be space surrounding the detector elements for readout circuitry, electrical interfaces, and mechanical support features. Even the most sophisticated detector packaging schemes are unable to provide a continuous array of pixels without gaps between detector modules.

Accordingly, it would be desirable to enable the use of multiple detector arrays, without a loss of image information in areas between adjacent detector arrays.

SUMMARY

The present disclosure provides imaging systems and methods that enable the collection of image information using multiple detector arrays, without the loss of information from areas at or corresponding to the boundaries between adjacent detector arrays. An imaging system in accordance with embodiments of the present disclosure includes imaging optics, field segmentation optics, and multiple detector arrays. The field segmentation optics are located between the imaging optics and the focal plane of the imaging optics, and form multiple component images or image segments corresponding to different sub-areas within a field of view of the imaging optics. Each component image is directed to one of the detector arrays. In accordance with embodiments of the present disclosure, each component image formed by the field segmentation optics encompasses a sub-area of a scene that at least partially overlaps an adjacent or neighboring sub-area of the scene encompassed by another one of the component images. Accordingly, systems in accordance with embodiments of the present disclosure collect multiple overlapping component images. A composite image is formed by registering and fusing the multiple overlapping image segments. In accordance with embodiments of the present disclosure, the composite image can be formed without a loss of image information in areas of overlap as compared to non-overlapping areas of the composite images.

In embodiments of the present disclosure, the "mosaic gap" problem is solved by placing field segmentation optics within an optical path of the imaging system. The field segmentation optics can be located nearer to the focal plane of the imaging optics than to the exit pupil of the imaging optics, and can be in the form of one or more mirrors. Alternatively or in addition, the field segmentation optics can be in the form of a multi-faceted prism. Each detector is located at a component focal plane on which a corresponding component image is focused. Accordingly, the detectors can be located on different physical planes.

Methods in accordance with embodiments of the present disclosure include collecting light from a scene using imaging optics that focus the collected light to form image information. The light collected by the imaging optics is divided into multiple overlapping component images by positioning field segmentation optics between the exit pupil and the focal plane of the imaging optics. Moreover, each component image is focused onto a component focal plane. The image information within each image component is detected by a detector located at each of the component focal planes. The image information thus collected is then registered and fused to create a composite image.

Additional features and advantages of embodiments of the present disclosure will become more readily apparent from the following description, particularly when considered together with the accompanying drawings.

DETAILED DESCRIPTION

Figure 1:
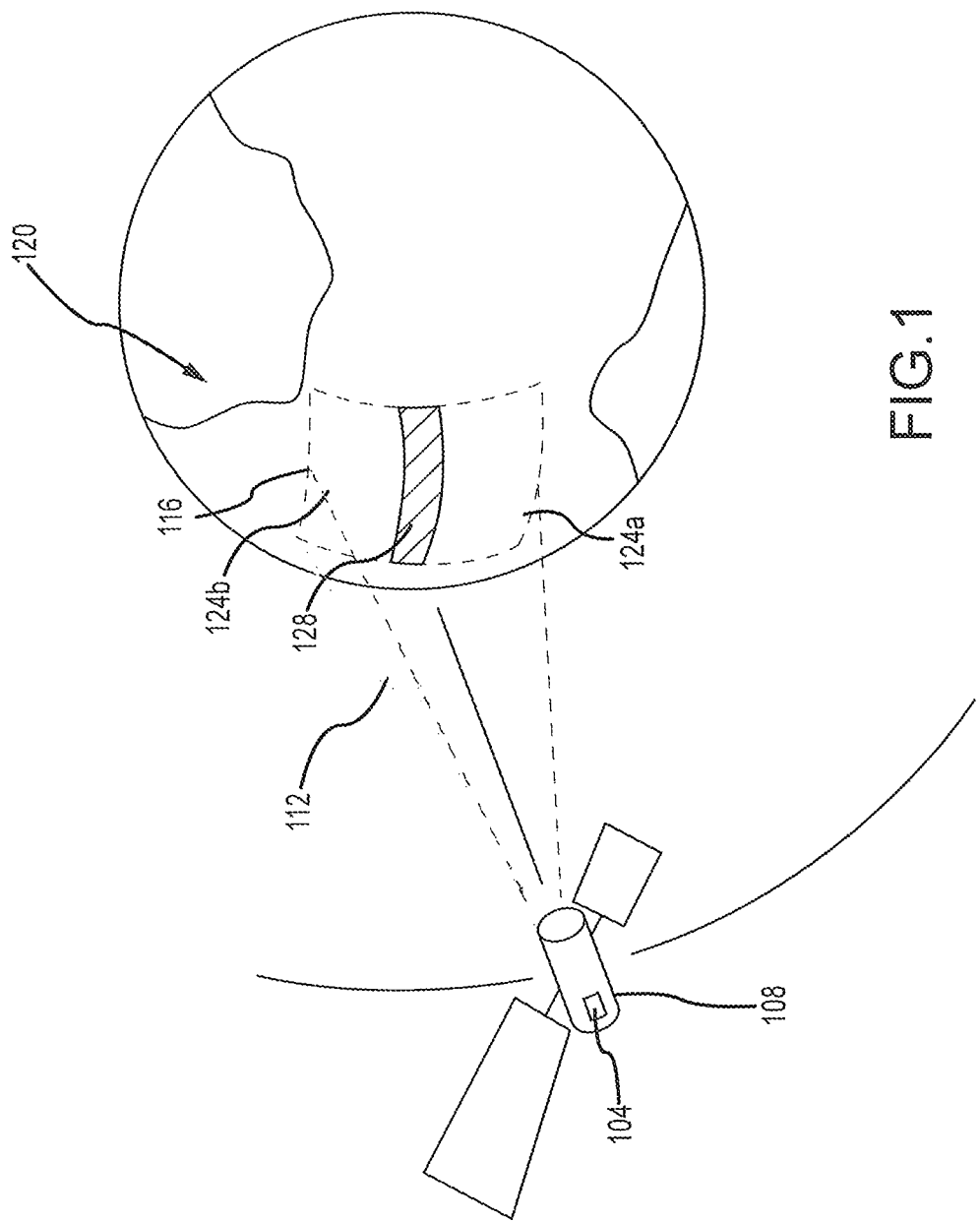
FIG. 1 depicts an imaging scenario incorporating an imaging system in accordance with an exemplary embodiment of the present disclosure.

FIG. 1 depicts an imaging scenario incorporating an imaging system 104 in accordance with an exemplary embodiment of the present disclosure. In this example, the imaging system 104 is carried on a platform 108. Although the platform 108 is shown as a satellite, embodiments of the present disclosure are not so limited, for example, the imaging system 104 can be associated with a platform 108 in the form of any sort of vehicle or stationary structure, such as an airplane, balloon, spacecraft, truck, car, ship, tower, tripod, etc. In accordance with still other embodiments, the imaging system 104 need not be associated with a platform. For instance, the imaging system 104 can be hand held. In general, the imaging system 104 has a field of view 112 from within which light reflected or originating from an area 116 of a scene 120 can be collected to form an image. In accordance with embodiments of the present disclosure, the light can be of various wavelengths, such as but not limited to visible light, infrared light, and ultraviolet light.

An imaging system 104 in accordance with embodiments of the present disclosure divides an area 116 of the scene 120 in the field of view 112 of the system 104 into multiple different sub-areas 124. Each sub-area 124 at least partially overlaps a neighboring or adjacent sub-area 124 within an overlap region or area 128. As discussed in greater detail elsewhere herein, the imaging system 104 includes multiple detectors, with a different detector assigned to creating an image, hereinafter referred to as a sub-image or component image, of each sub-area 124. Because each sub-area 124 overlaps each neighboring sub-area 124, and thus each component image encompassing a sub-area 124 partially overlaps a component image encompassing a neighboring sub-area 124, a composite image of the entire area 116 within the field of view 112 of the system 104 can be formed, while avoiding the undesirable effects typically encountered by systems incorporating multiple detectors to collect images of a scene within a common integration period.

Figure 2A:
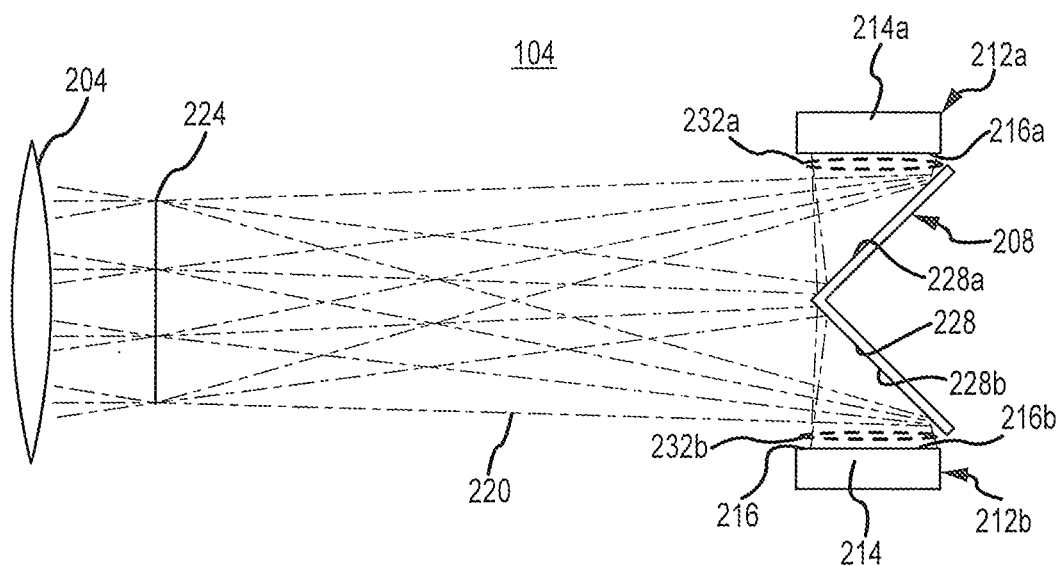
FIGS. 2A and 2B depict an imaging system in accordance with embodiments of the present disclosure in which two component images are formed.
Figure 2B:
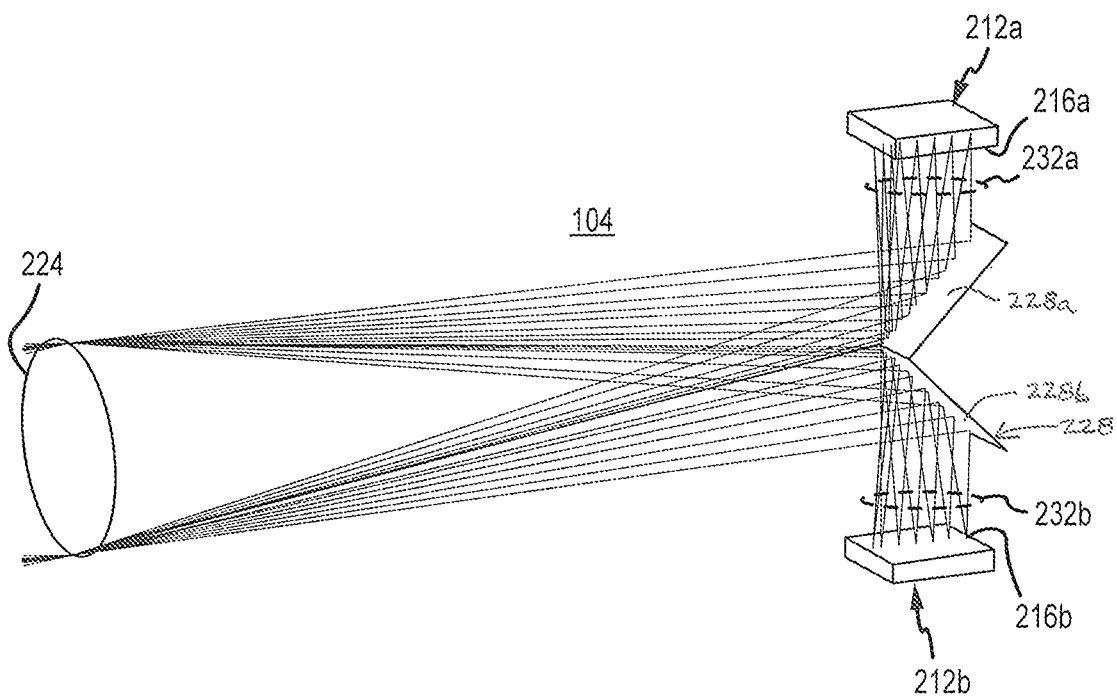

FIGS. 2A and 2B depict components of an imaging system 104 in accordance with embodiments of the present disclosure. The imaging system 104 generally includes imaging optics 204, field segmentation optics 208, and a plurality of detectors 212. In addition, as can be appreciated by one of skill in the art after consideration of the present disclosure, an imaging system 104 in accordance with embodiments of the present disclosure can include a shutter, aperture, control system, power supply, support structure, and other ancillary components typical of an electronic or digital imaging system.

The imaging optics 204 collect light from within the field of view 112 of the imaging system 104, and focus the collected light onto a focal plane 216. As an example, but without limitation, the imaging optics 204 can be configured as a telescope. Moreover, the imaging optics 204 can include refractive, reflective, or combinations of refractive and reflective elements.

The field segmentation optics 208 are located in an optical path 220 defined at least in part by the imaging optics 204. More particularly, the field segmentation optics 208 are located between the exit pupil 224 of the imaging optics 204, and the focal plane 216. In accordance with embodiments of the present disclosure, the field segmentation optics 208 are located closer to the focal plane 216 than to the exit pupil 224. The field segmentation optics 208 divide the light collected by the imaging optics 204, and in particular define multiple sub-images 232 corresponding to the multiple sub-areas 124 included in the area 116 within the field of view 112 of the system 104. Moreover, neighboring sub-images 232 defined by the field segmentation optics 208 encompass sub-areas 124 that overlap one another in an overlap area or areas 128. The field segmentation optics 208 in the example configuration illustrated in FIGS. 2A and 2B include two facets 228 that divide the light passed along the optical path 220 of the imaging system 104 into two component or sub-images 232. Accordingly, the focal plane 216 in this example is a split focal plane that includes a first component focal plane 216a and a second component focal plane 216b. More particularly, a first one of the facets 228a directs a first one of the component images 232a onto the first component focal plane 216a and a second one of the facets 228b directs a second one of the component images 232b onto the second component focal plane 216b. Each of the component focal planes 216a and 216b are the same focal distance from the imaging optics 204. As shown, the facets 228 can be in the form of reflective or mirrored planar surfaces. In accordance with other embodiments of the present disclosure, the facets 228 can be in the form of prisms or prism facets.

In accordance with embodiments of the present disclosure, one detector 212 is provided for each component image 232 formed by the field segmentation optics 208. Accordingly, in the example imaging system 104 of FIGS. 2A and 2B, the plurality of detectors 212 includes first 212a and second 212b detectors. As an example, but without limitation, the detectors 212 can include detector arrays or image sensors 214 having two-dimensional arrays of photosensitive sites or pixels that generate an electric charge in response to exposure to light. Accordingly, the detectors 212 can include detector arrays 214 in the form of charge coupled devices (CCD), complementary metal oxide semiconductor (CMOS) devices, organic photodetectors, or other solid-state imaging devices. In accordance with still other embodiments of the present disclosure, the detectors 212 can include sheets or rolls of photographic film. The detectors 212 are located such that light sensitive surfaces of the detectors 212 are coincident with the component focal planes 216a and 216b defined by the imaging optics 204 and the field segmentation optics 208.

Figure 3:
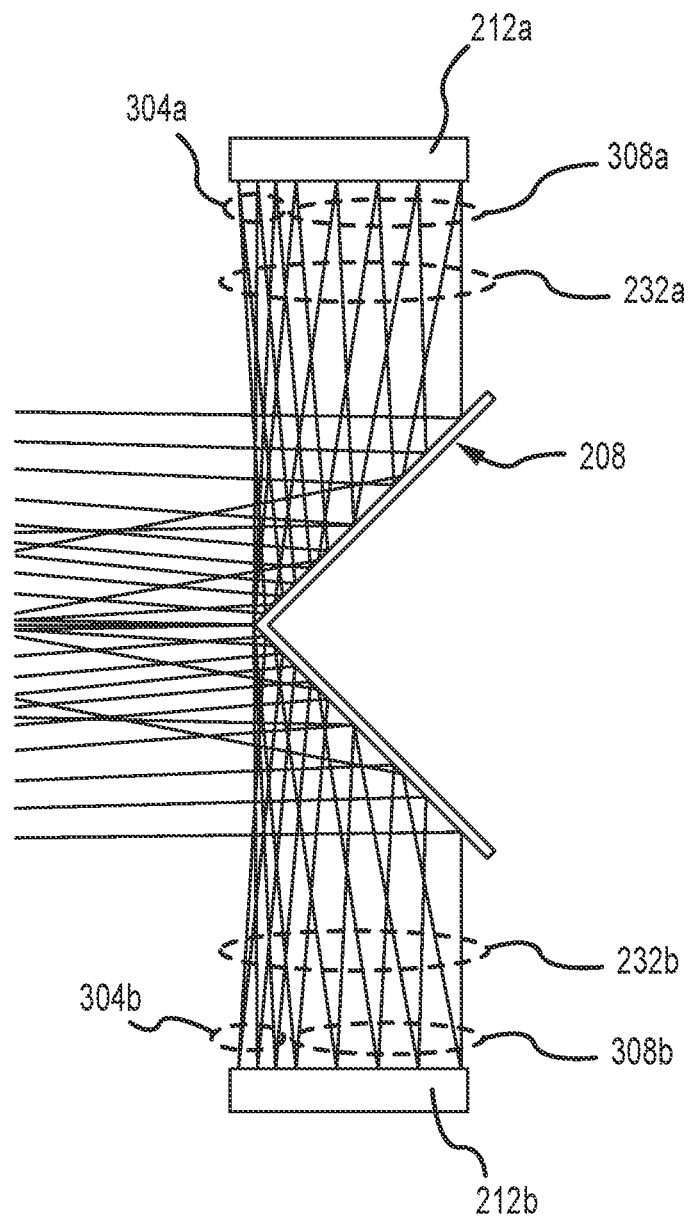
FIG. 3 depicts overlapping and non-overlapping portions of light collected from a scene in a two detector imaging system in accordance with embodiments of the present disclosure.

As can be appreciated by one of skill in the art after consideration of the present disclosure, the placement of the field segmentation optics 208 between the exit pupil 224 and the focal plane 216 creates component images or sub-images 232 that partially overlap one another. As illustrated in FIG. 3, light included in a sub-image or a component image 232 collected from a sub-area 124 includes at least one overlapping light portion 304 and a non-overlapping light portion 308. The light in the overlapping light portion or portions 304 is light collected from the overlapping area or areas 128 of the sub-area 124, while the light in the non-overlapping light portion 308 is light collected from the non-overlapping portion of the sub-area 124. In a two detector 212 imaging system 104 in accordance with embodiments of the present disclosure, the overlapping portion of light 304a included in the first component image 232a and the overlapping portion of light 304b included in the second component image 232b are collected from the same area 128 within the field of view 112 of the imaging system 104. The nonoverlapping portions of light 308 are unique to the respective component images 232. That is, the non-overlapping portion of light 308a in the first component image 232a includes light collected from a different portion of the scene 120 than the nonoverlapping portion of light 308b in the second component image 232b. For example, and with reference again to FIG. 1, the first sub-image 232a formed on a surface of the first detector 212a includes image information from the first sub-area 124a, while the second sub-image 232b formed on a surface of the second detector 212b includes image information from the second sub-area 124b. Moreover, the first sub-image 232a includes image information 304a from the overlapping area 128, in addition to image information 308a collected from a non-overlapping portion of the area 124a, while the second sub-image 232b includes image information 304b from the overlapping area 128, in addition to image information 308b collected from a non-overlapping portion of the area 124b.

Figure 4:
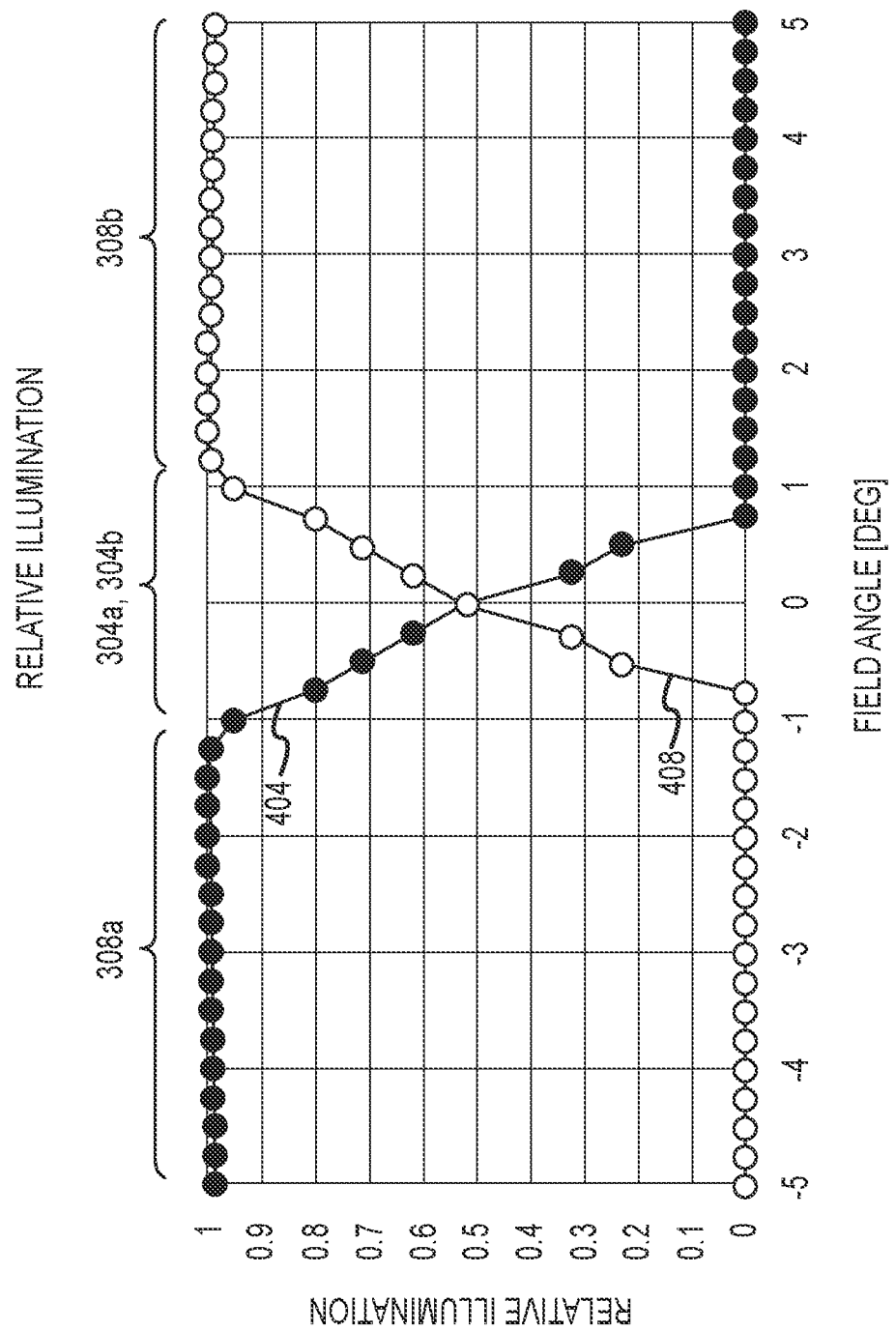
FIG. 4 is a graph illustrating the relative illumination of the detectors in a two-detector imaging system in accordance with embodiments of the present disclosure.

FIG. 4 is a graph illustrating the relative illumination of the detectors 212 in an example two-detector imaging system 104 in accordance with embodiments of the present disclosure. The first plot 404 depicts the relative intensity of light at different field angles within a selected plane within the field of view 112 of the imaging system 104 received at the first detector 212a, while the second plot 408 depicts the relative intensity of light at different field angles within the selected plane within the field of view 112 of the imaging system 104 received at the second detector 212b. In this example, the light included in the first nonoverlapping portion 308a is collected from a first sub-area 124a within a field angle of about −5° to about −1°, and has a relative intensity at the first detector 212a of 1. No light within the first nonoverlapping portion 308a is delivered to the second detector 212b, thus the corresponding intensity of the light received at the second detector 212b at the field angles encompassing the first sub-area 124a is zero. The light included in the overlapping portions 304a and 304b is collected from the overlap area 128, which in this example is within a field angle of about −1° to about 1°. As the field angle increases from about −1° to about 1°, the intensity of the light received at the first detector 212a decreases from 1 to 0, while the intensity of the light received at the second detector 212b increases from 0 to 1. The light included in the second nonoverlapping portion 308b is collected from a sub area within a field angle of about 1° to about 5°, and has a relative intensity at the first detector 212b of 1. No light within the second nonoverlapping portion 308b is delivered to the first detector 212a, thus the corresponding intensity of the light received at the first detector 212a at the field angles encompassing the second sub-area 124b is zero. As demonstrated by the example relative illumination values, by adding the image information or signals collected from the overlapping portions 304a and 304b, the resulting relative illumination is constant or about constant (e.g. within +/−5%) across the entire field of view 112.

Figure 5A:
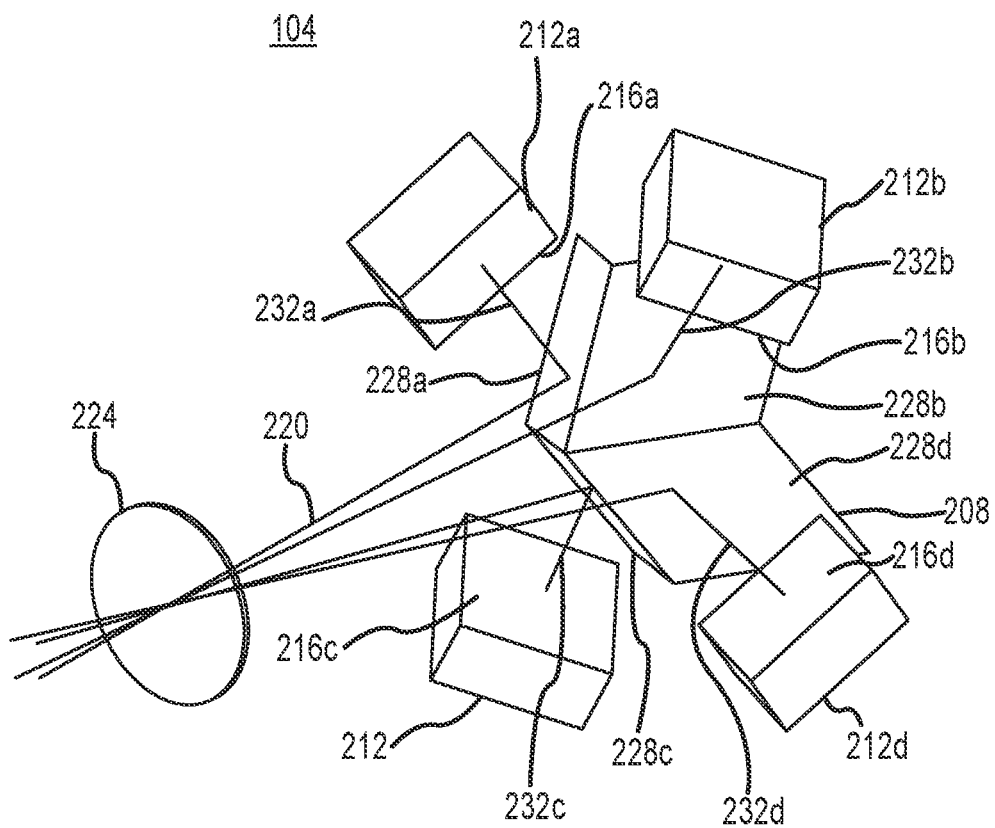
FIGS. 5A and 5B depict an imaging system in accordance with embodiments of the present disclosure in which four component images are formed.
Figure 5B:
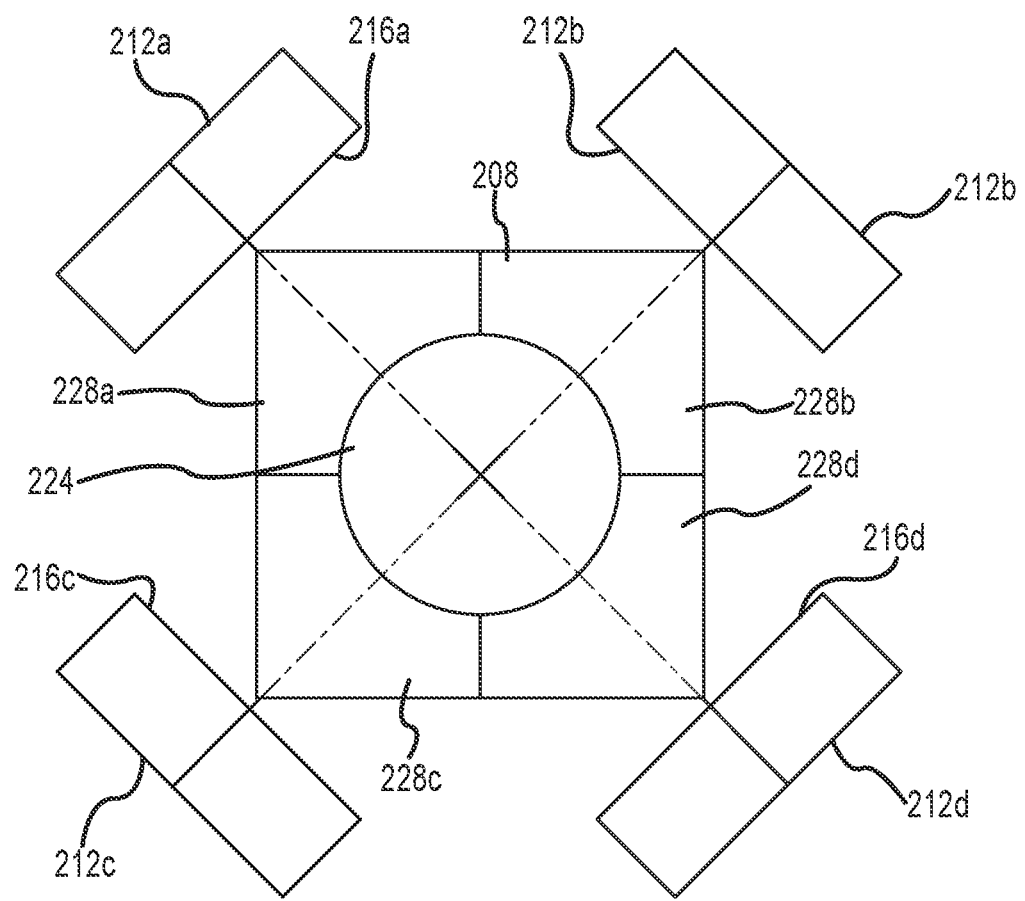
Figure 6:
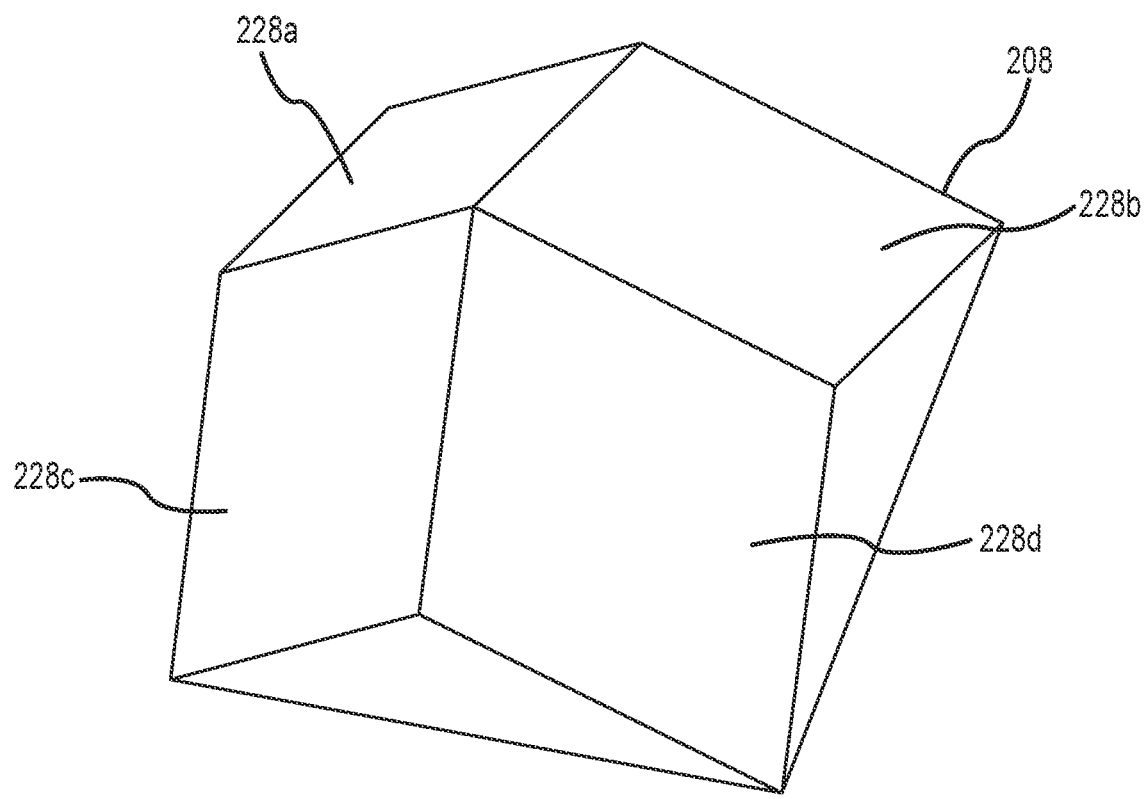
FIG. 6 depicts a faceted mirror in accordance with embodiments of the present disclosure.

Imaging systems 104 in accordance with embodiments of the present disclosure can form different numbers of sub-images 232, and can include a corresponding number of detectors 212. For example, FIGS. 5A and 5B depict a four detector 212 imaging system 104 in accordance with embodiments of the present disclosure. In this example, the field segmentation optics 208, depicted in FIG. 6, can include a faceted mirror having four mirror segments 228a-d located along the optical path 220 of the imaging system 104, with each mirror segment 228a-d directing light collected from within a different sub-area 124 to a corresponding detector 212a-d. In this example, each of the component focal planes 214 corresponding to the locations of the light sensitive surfaces or planes of the detectors 212 are in different planes.

Figure 7:
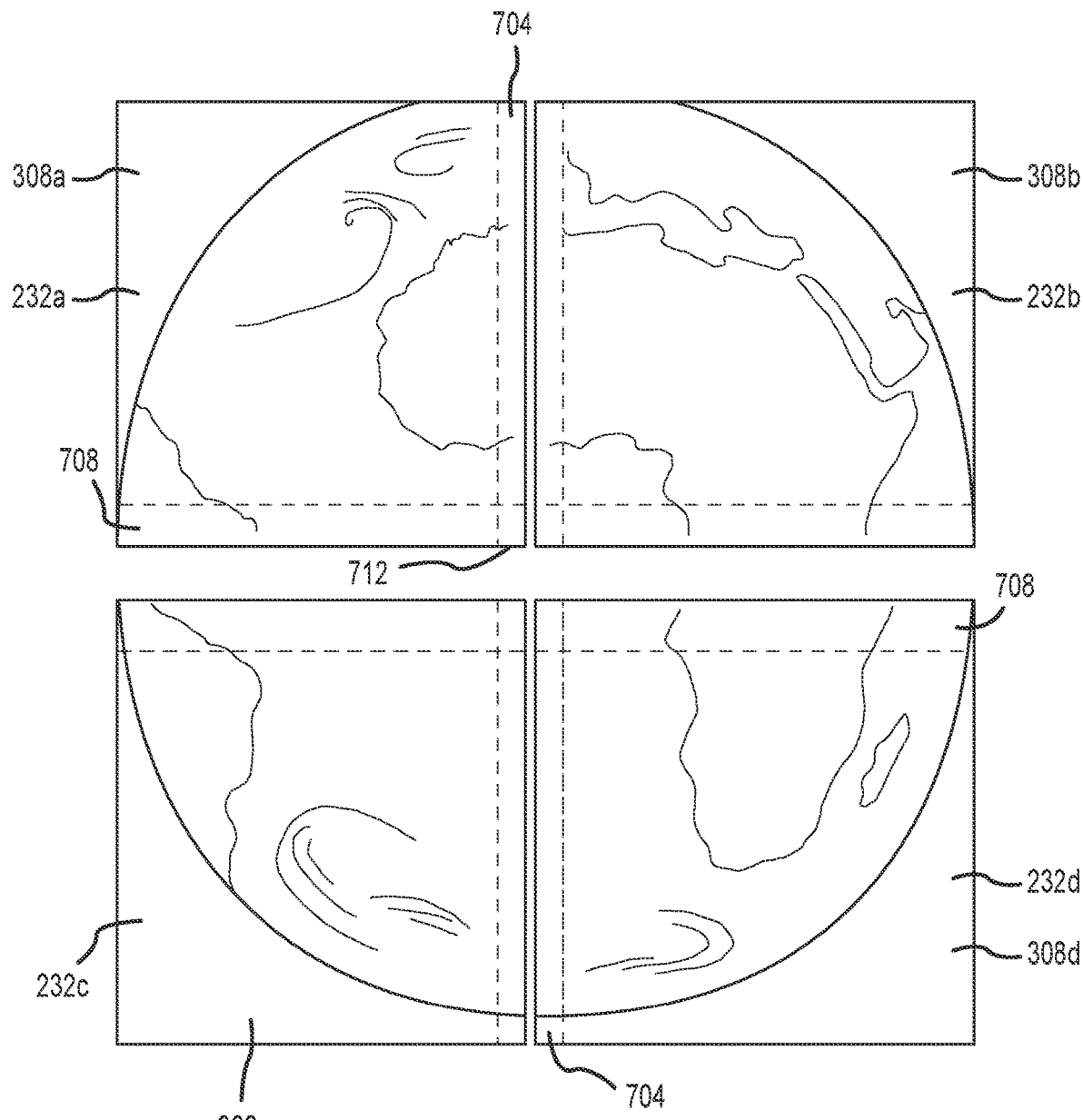
FIG. 7 depicts component images collected by a four component image imaging system in accordance with embodiments of the present disclosure.

FIG. 7 depicts component images 232 collected by a four detector 212 imaging system 104 in accordance with embodiments of the present disclosure. More particularly, the component images 232a-d, as imaged onto corresponding detectors 212a-d having light sensitive surfaces located at the respective component focal planes 216a-d, are depicted. In this example, the light included in each of the component images 232a-d includes a first overlapping light portion 704 shared with a horizontally adjacent component image 232, and a second overlapping light portion 708 shared with a vertically adjacent component image. In addition, a third overlapping light portion 712 that includes both a portion of the first 704 overlapping light portion 704 and the second overlapping light portion 708 is included in each of the component images 232a-d. Portions of component images 232 not included in any overlapping portion 704, 708, or 712 are part of non-overlapping light portions 308, each of which is unique to the component image 232 in which it is included.

Figure 8:
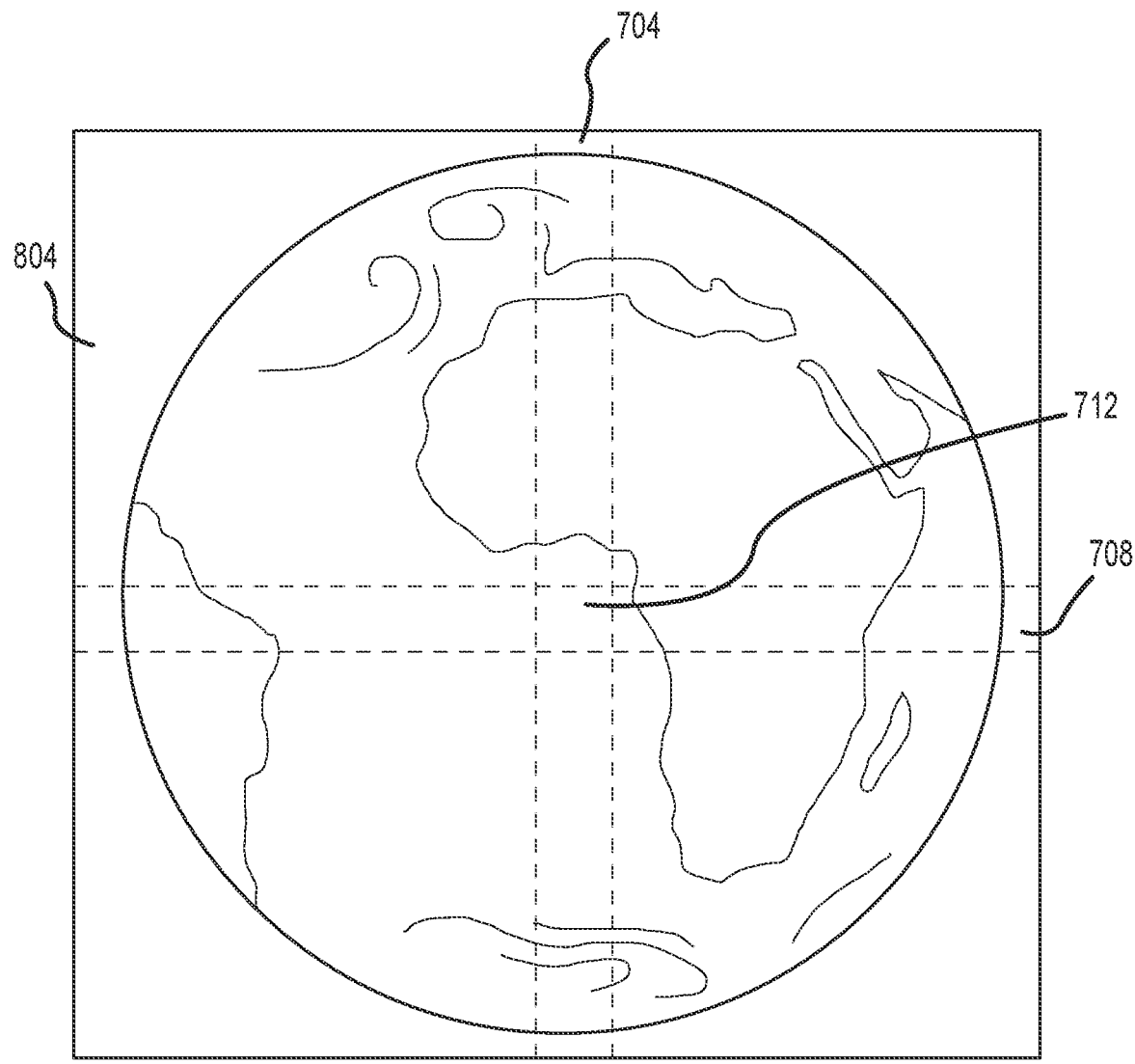
FIG. 8 depicts a composite image formed from component images in accordance with embodiments of the present disclosure.

FIG. 8 depicts a composite image 804 formed from the component images 232a-d received at the detectors 212 in the example of FIG. 7. More particularly, the composite image 804 is a result of combining or fusing image information from the different component images 232 collected at the different imaging system 104 detectors 212a-d. In general, fusing the image information includes registering the overlapping component images 232a-d (i.e., the component images 232a-d encompassing overlapping sub-areas 124 of the imaged area 116), and adding the intensity information within the component images 232a-d encompassing the overlap region or regions 128. In accordance with embodiments of the present disclosure, the portions of the composite image 804 corresponding to the various overlapping light portions 704, 708, and 712 formed from combining signals from two or more detectors 212 are indistinguishable from the portions of the composite image 804 formed from signals supplied by only one of the detectors 212.

Figure 9A:
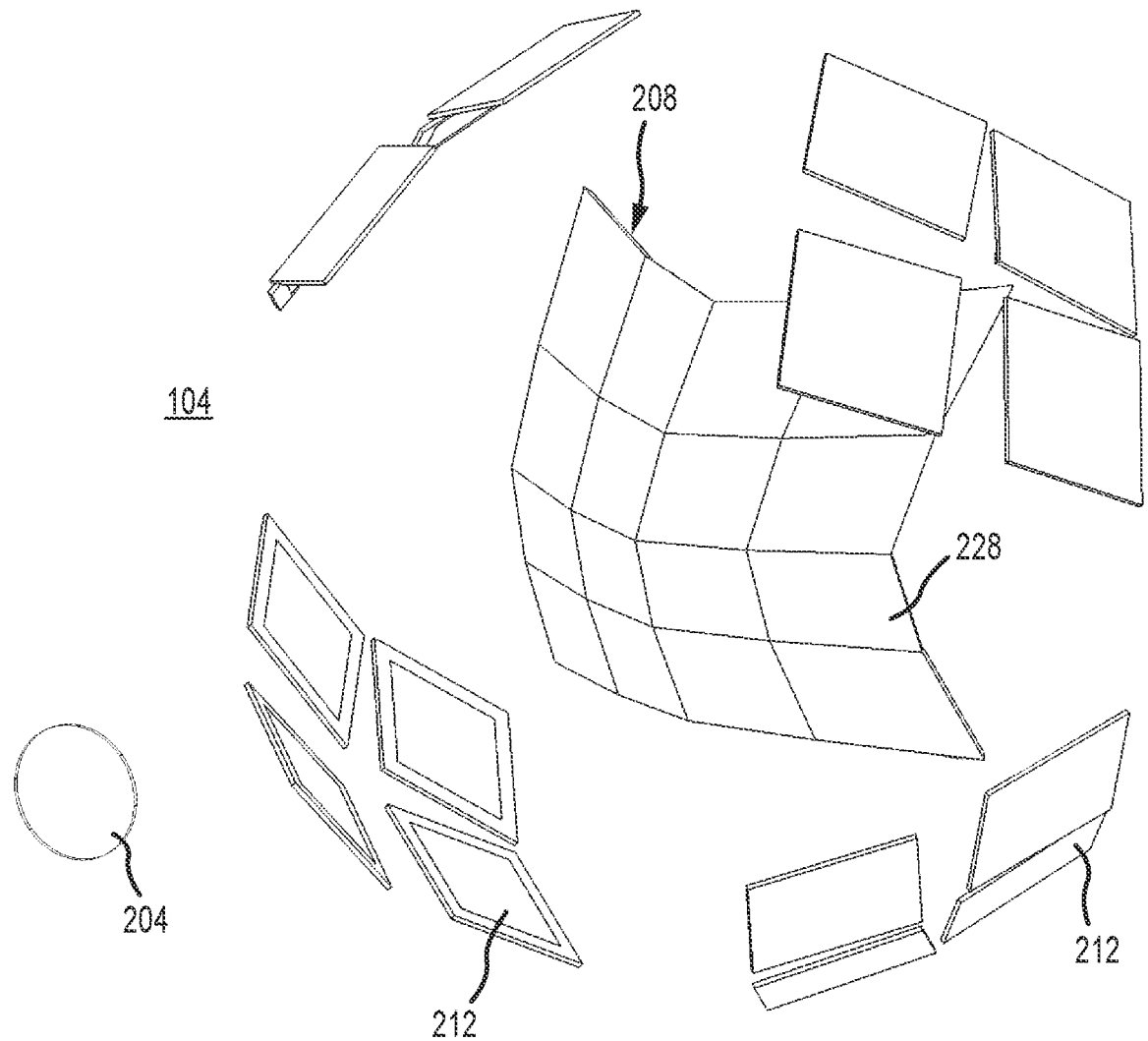
FIGS. 9A and 9B depict an imaging system in accordance with embodiments of the present disclosure in which sixteen component images are formed.
Figure 9B:
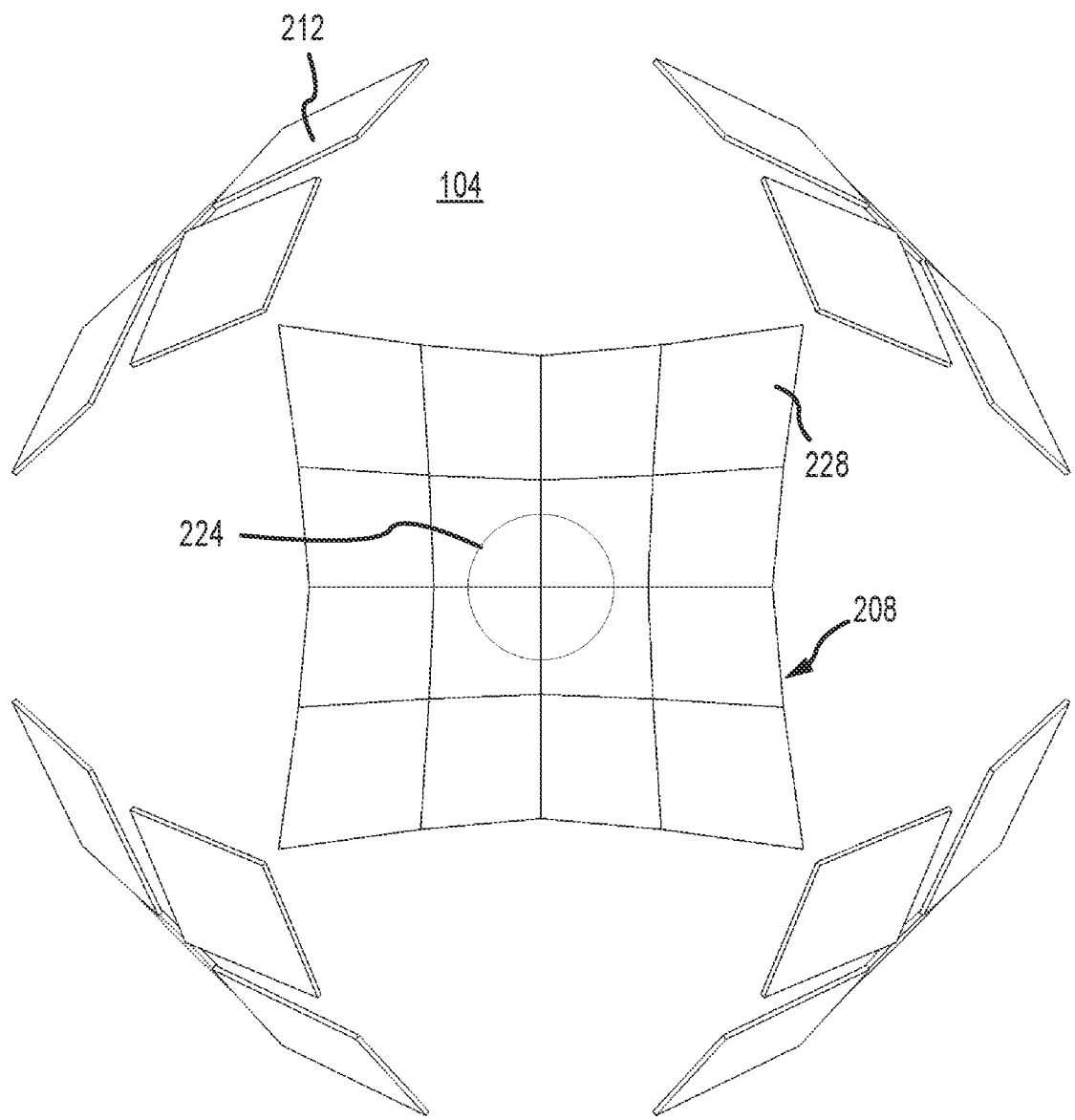

FIGS. 9A and 9B depict a sixteen component image imaging system 104 in accordance with embodiments of the present disclosure. As depicted in this example, the field segmentation optics 208 can include a multi-faceted mirror, with sixteen facets 228 intersecting a portion of the light collected by the imaging optics 204 and passed along the optical path 220. Moreover, the facets 228 at which collected light is received can be disposed in a roughly semicircular configuration. In this example, sixteen detectors 212 are disposed to receive the sixteen component images 232 formed by the facets 228, in a 1:1 relationship. An active surface of each detector 212 is at the same focal distance from the imaging optics 204. Due to the placement of the field segmentation optics 208 within the optical path 220, and closer to the focal plane 216 than to the exit pupil 224, each component image formed at each detector 212 encompasses a sub-area of the scene that partially overlaps the sub-area included in the component image formed at neighboring detectors 212. Accordingly, a composite image that does not vary in image quality across the image can be formed by fusing the component images.

Figure 10A:
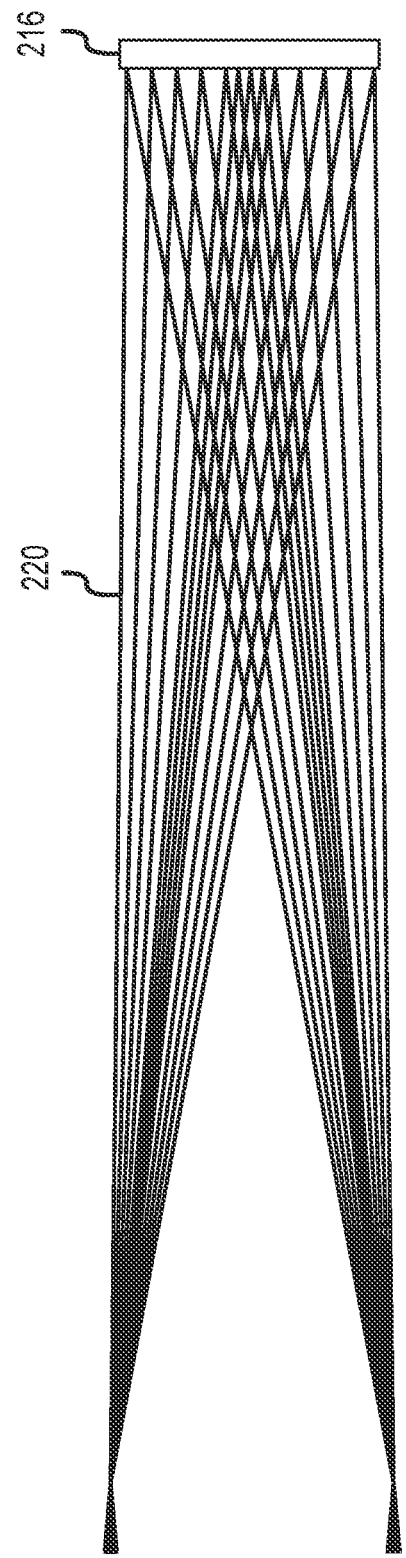
FIGS. 10A and 10B depict imaging systems in accordance with embodiments of the present disclosure having prisms as field segmentation optics.
Figure 10B:
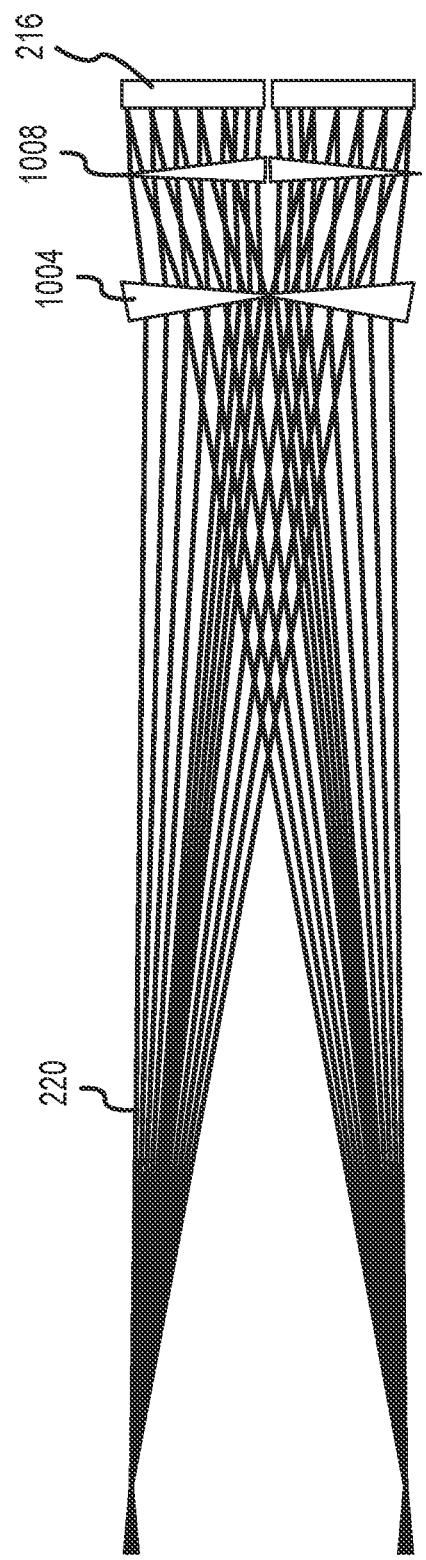
Figure 11A:
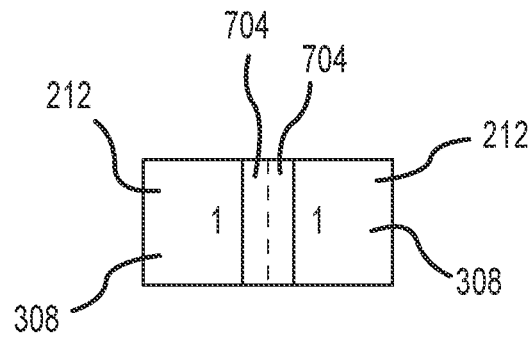
FIGS. 11A, 11B, 11C and 11D depict overlap regions between component images formed by imaging systems in accordance with embodiments of the present disclosure.
Figure 11B:
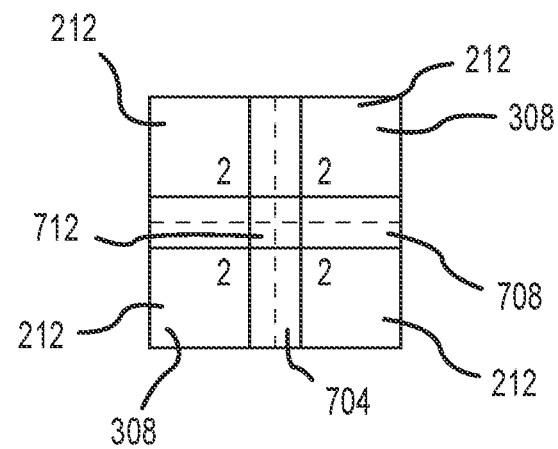
Figure 11C:
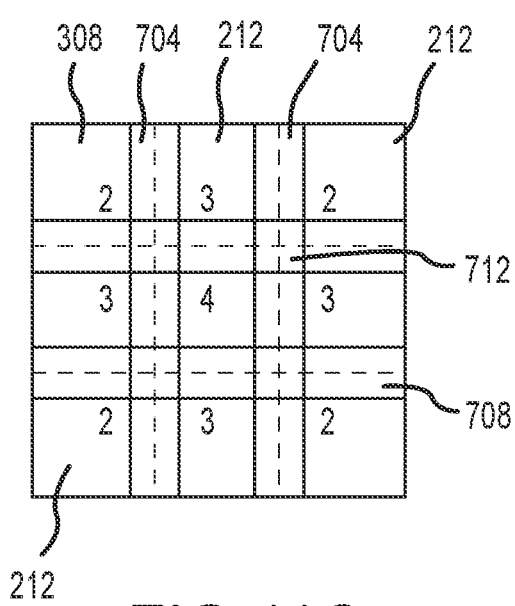
Figure 11D:
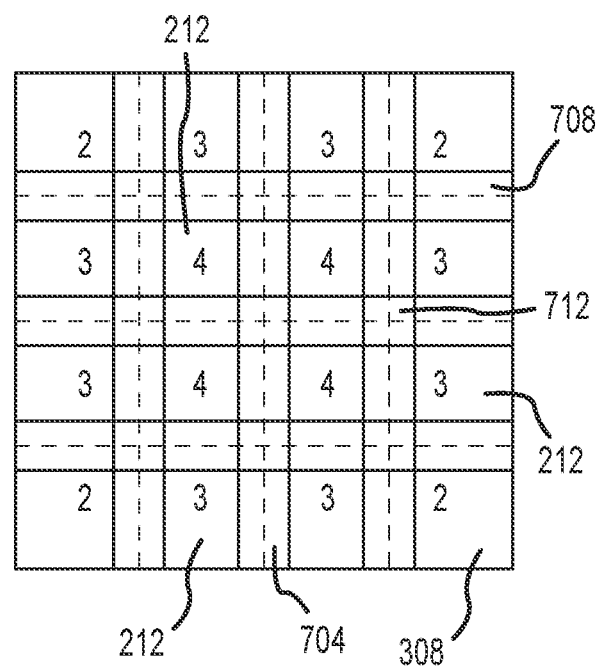

FIGS. 10A and 10B depict imaging systems in accordance with embodiments of the present disclosure having prisms as field segmentation optics 208. In general, the prisms 1004 are located along the optical path 220, and are closer to the focal plane 216 than to the exit pupil 224. Moreover, the prisms 1004 divide the light in the optical path 220 into multiple, partially overlapping fields. As shown in FIG. 10B, a second set of prisms 1008 can be included. The second set of prisms 1008 have a wedge angle opposite the first set of prisms 1004, to redirect the field segments back to focus on a common focal plane. This configuration separates component images, while allowing the component focal planes 214, and thus the different detectors 212, to be located on a common physical plane. As can be appreciated by one of skill in the art after consideration of the present disclosure, while the detectors 212 are physically separated from one another, they receive component images 232 consisting of light collected from sub-areas 124 of the area 116 within the field of view 112 of the system 104 that partially overlap adjacent sub-areas 124. In accordance with at least some embodiments of the present disclosure, each prism 1004, 1008 can be replaced by an achromatic prism pair, which can partially correct for chromatic aberrations. Aberrations can also be reduced by introducing cylindrical or spherical surfaces on the prisms.

FIGS. 11A, 11B, 11C and 11D depict the imaging surfaces of detectors 212, and in particular depict overlap regions 704, 708, and 712 and non-overlap regions 308 of a composite image 804 in multiple component image imaging systems 104 in accordance with embodiments of the present disclosure. The number of overlap regions in different schemes involving imaging systems 104 having 2, 4, 9, and 16 detectors 212 respectively are illustrated. Each array segment is labeled with the number of edges that are shared with neighbor arrays: 1, 2, 3, or 4. Note that overlap regions 712 that encompass light included in more than two component images 232 only occur in imaging systems 104 having more than two detectors 212.

Figure 12:
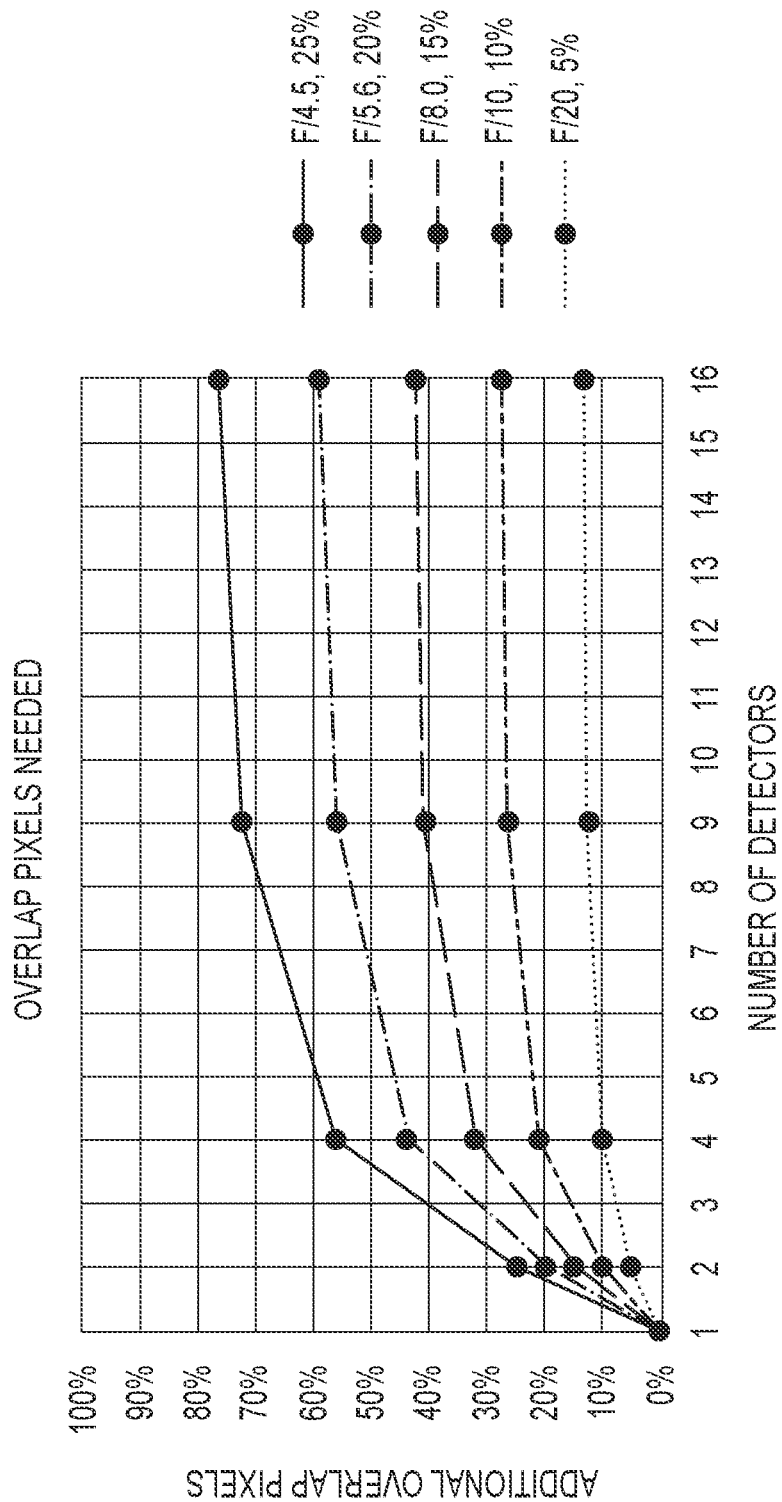
FIG. 12 is a graph depicting relationships between a required amount of pixel overlap versus number of component images at different optical system speeds in accordance with embodiments of the present disclosure.

FIG. 12 is a graph depicting relationships between a required amount of pixel overlap versus number of component images 232 at different optical system speeds in accordance with embodiments of the present disclosure. In particular, the required fraction of each detector 212 dedicated to overlap regions 204 or 208 is plotted, under some simplifying assumptions as to the position of the field segmentation optics 208, to ensure a constant or near-constant resolution and relative illumination across the entire composite image. For example, a near constant illumination can be an illumination that varies by less than 5% across the system field of view 112. The graph gives an indication of the amount of overlap "overhead" incurred in choosing to spread the field of view 112 of the imaging system 104 across a certain number of detector arrays 212. The amount of detector 212 area that needs to be dedicated to the overlap regions increases with number of detectors 212 and with the optical 'speed', or lower f-number, of the imaging system 104. In general, the overlap is increased as the field segmentation optics are moved closer to the exit pupil 224 of the imaging optics 204. Note that the case that uses nine detector arrays 212 (as in FIG. 11C) involves a single detector 212 array at the center of the field. In this situation, the field segmentation optics 208 may consist of a square aperture surrounded by eight mirror facets. Light heading toward the central detector 212 would pass through the aperture without reflection, while the other field segments would reflect off of mirror facets onto their respective detectors.

Figure 13A:
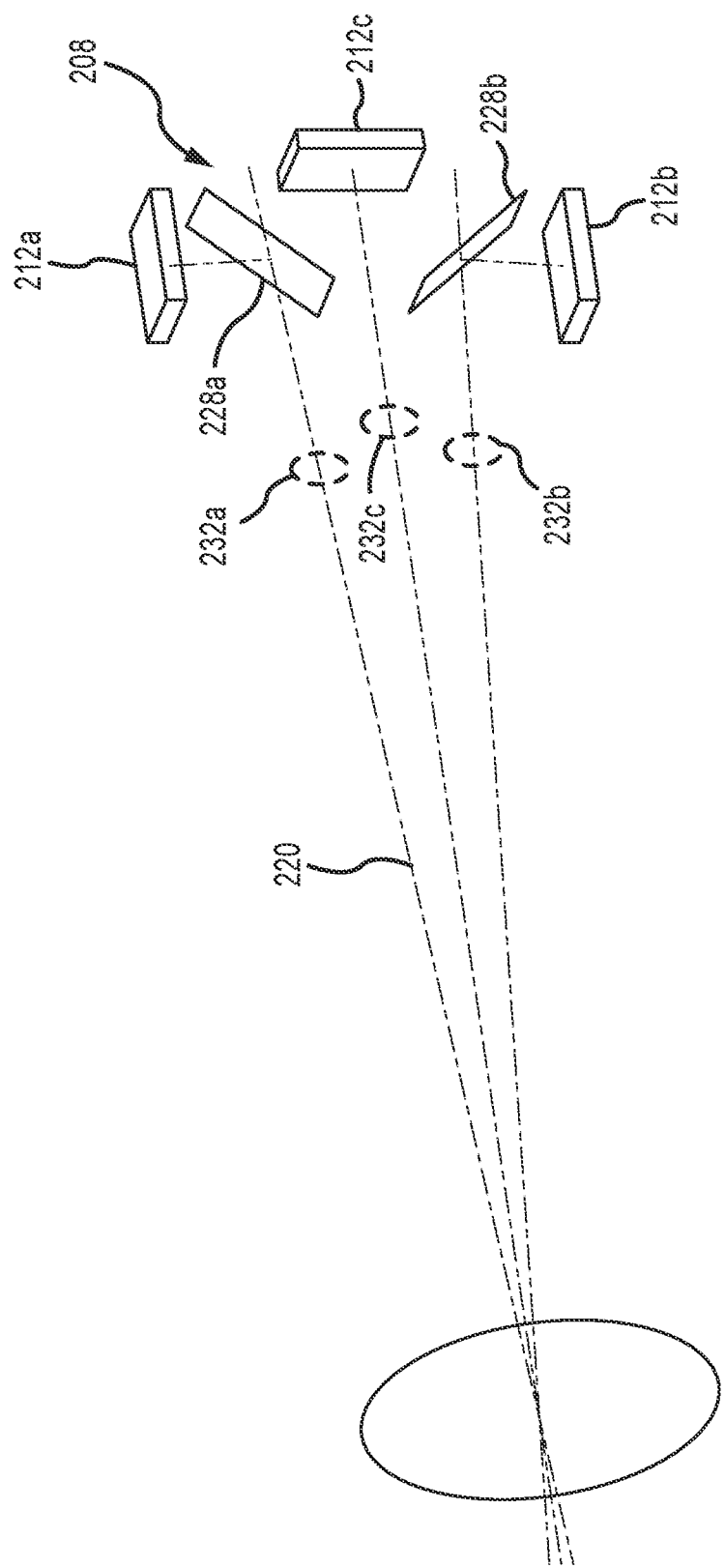
FIGS. 13A and 13B depict a three component image imaging system in accordance with embodiments of the present disclosure.
Figure 13B:
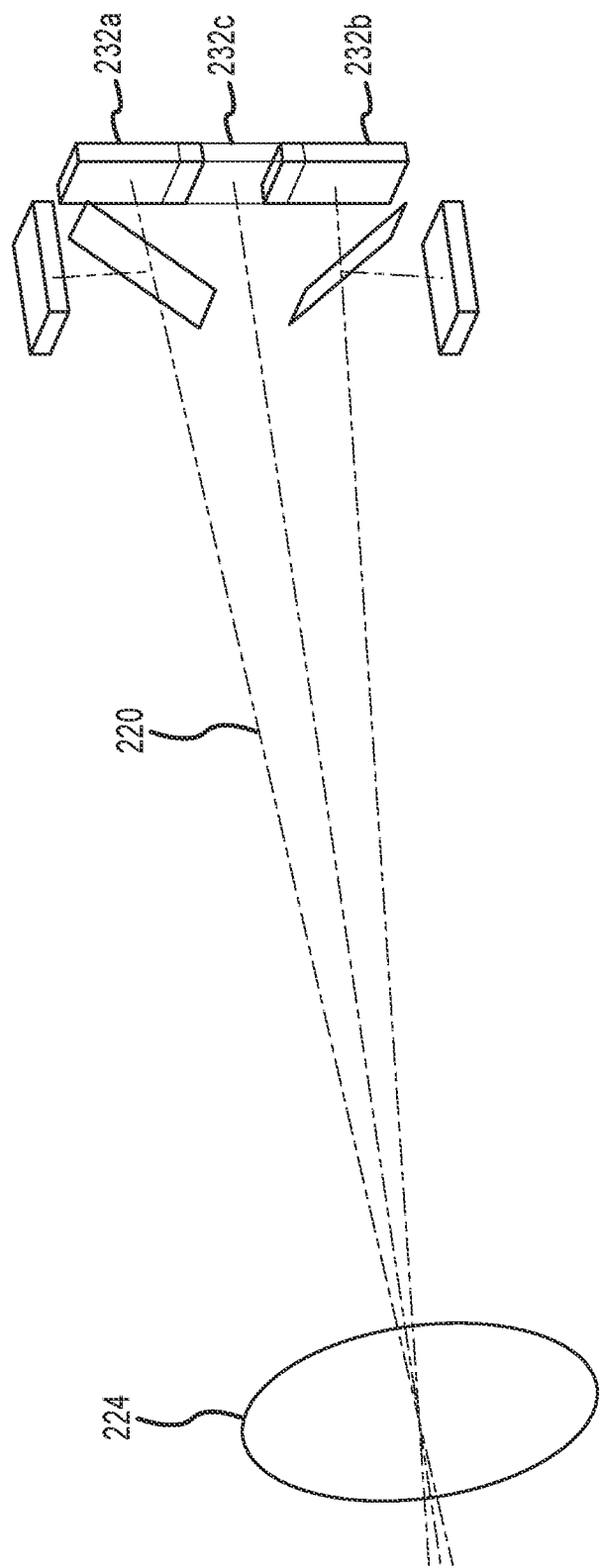

FIGS. 13A and 13B depict a three component image 232*a-c* imaging system 104 in accordance with embodiments of the present disclosure. More particularly, a configuration that combines three detectors 212 in a single row, using field segmentation optics 208 that include a central aperture region and two mirrors 228. Accordingly, for the central detector 212*c* there is no mirror between the exit pupil 224 and the detector 212. The mirrors 228*a* and 228*b* on either side of the central detector 212*c* define the field segments, reflecting light headed to those segments onto the top 212*a* and bottom 212*b* detectors. The cross-fade effect that happens at the border between the component images 232*a* and 232*b* directed by the mirrors 228 to the detectors 212*a* and 212*b* and the component image 232*c* that is not reflected by the mirrors 228 (depicted in FIG. 13B) is the same as or similar to the cross fade between adjacent component images 232 defined by mirrors having intersecting edges.

Variations on this approach include as few as two detectors and a single mirror, to any number of alternating pairs of reflected-transmitted field segments. The same reflection-transmission concept applies to two-dimensional arrays of detectors as well. For example, in a nine-detector configuration central field segment is an open segment, with the eight surrounding segments defined by mirror facets. The number of possible detectors that can be arrayed in this fashion is unlimited in principle.

Figure 14A:
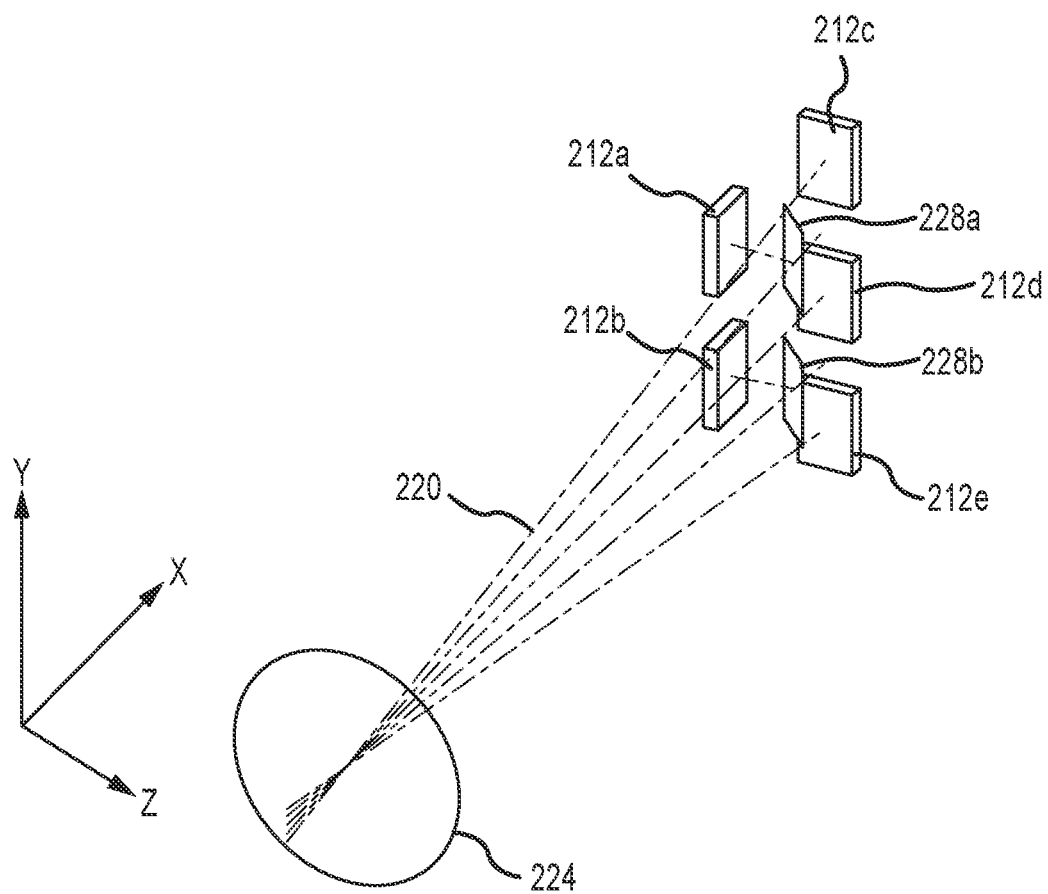
FIGS. 14A, 14B, 14C, and 14D depict a five component image imaging system in accordance with embodiments of the present disclosure.
Figure 14B:
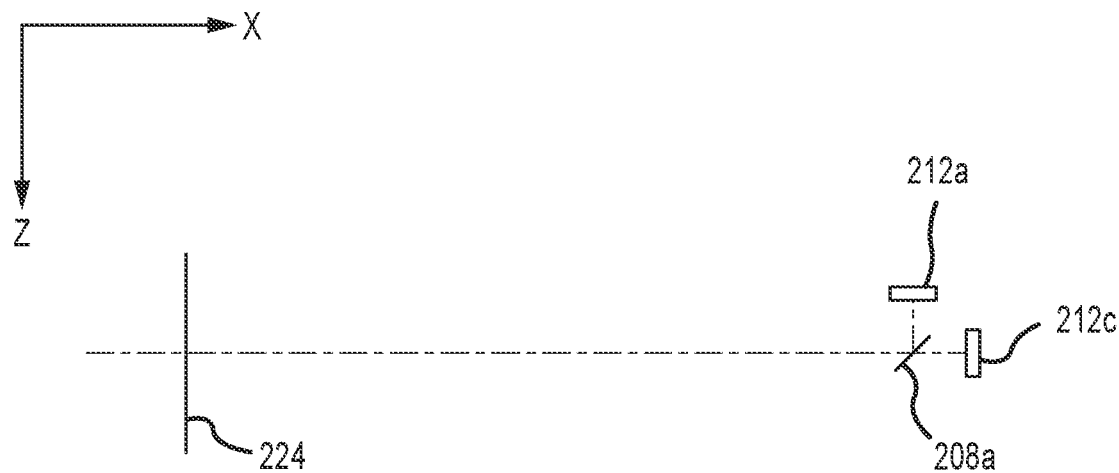
Figure 14C:
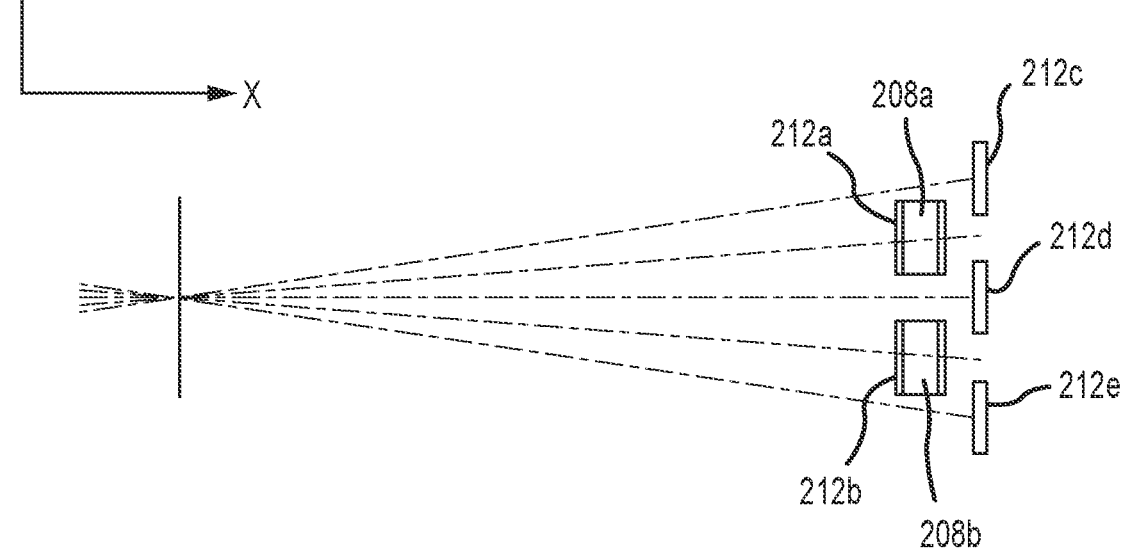
Figure 14D:
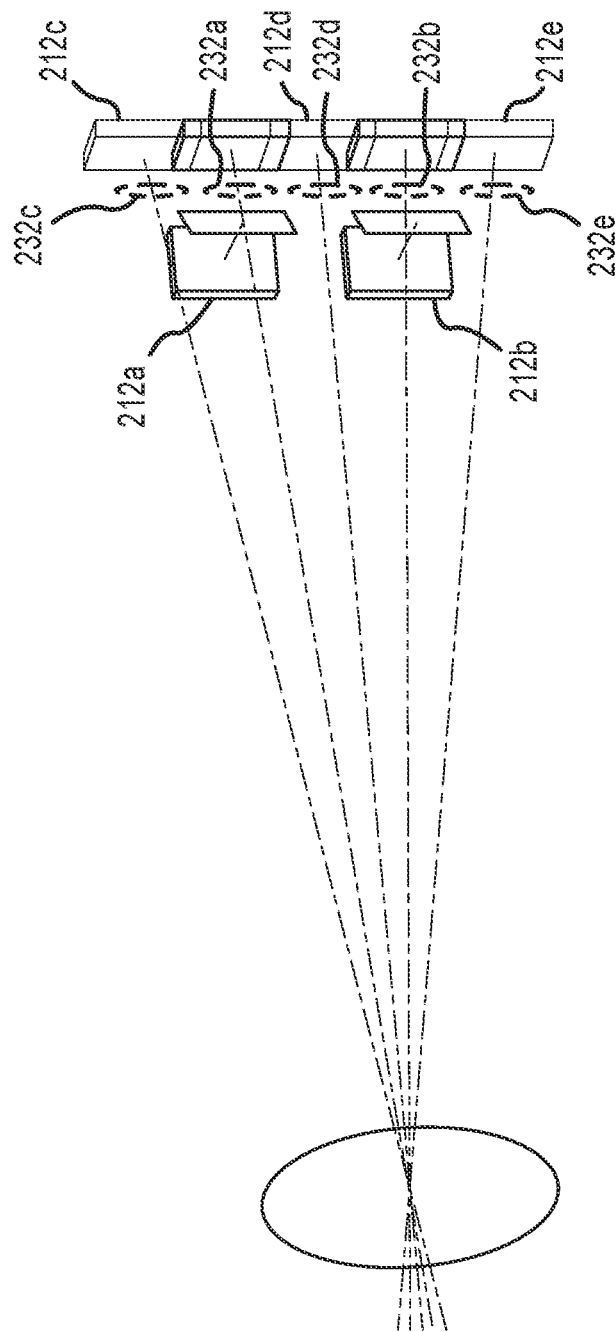

FIGS. 14A, 14B, 14C, and 14D depict a multiple component image imaging system 104 in accordance with further embodiments of the present disclosure. In particular, a configuration optimized for scanning-type imaging systems 104 is illustrated. Scanning systems are commonly used when high resolution is needed. The detectors 212 in such embodiments can consist of linear arrays of detection elements, or wide-aspect-ratio arrays with a limited number of rows in the along-track direction and many pixels in the cross-track direction. Typically, a number of detectors 212 are laid out at the focal plane in a staggered arrangement with some overlap in coverage in the cross-track direction. In this example, the array layout is similarly staggered, but two of the arrays are mounted on a secondary focal plane, with mirrors 228*a* and 228*b* directing a portion of the field to the secondary plane. FIG. 14D shows how the virtual component images 232*a* and 232*b* of the detectors 208*a* and 208*b* on the secondary plane line up with the component images 232*c-e* of the detectors 208*c-e* on the primary plane to form a continuous linear array, with overlapping seams. The advantage of this arrangement is that the along-track field of view (FOV) of the optics can be reduced significantly. This FOV can often be the limiting factor in the design of scanning optics. Accordingly, higher performing, lower size, weight, and power (SWAP) systems are enabled. Another advantage is that all detector modules are imaged simultaneously, whereas in the traditional staggered array there is a small difference in time and view angle between the rows of detector modules. Variations on the linear approach include expanding to any number of modules in the cross-track direction. The mirrors do not need to be at 45 degrees as shown, but can be at any convenient angle.

Figure 15A:
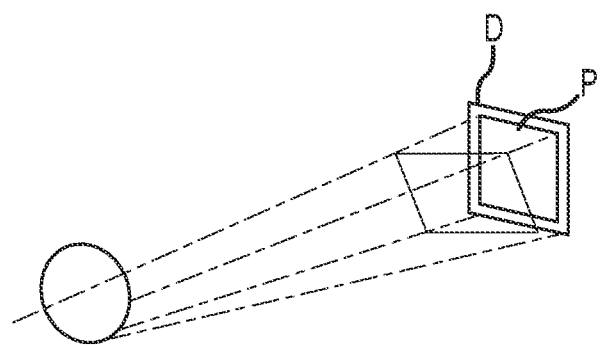
FIGS. 15A, 15B and 15C depict design considerations for a multiple component image imaging system in accordance with embodiments of the present disclosure.
Figure 15B:
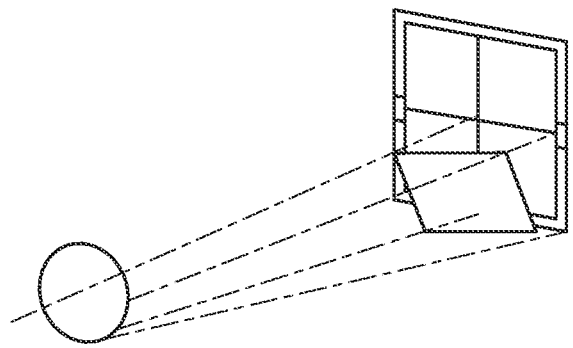
Figure 15C:
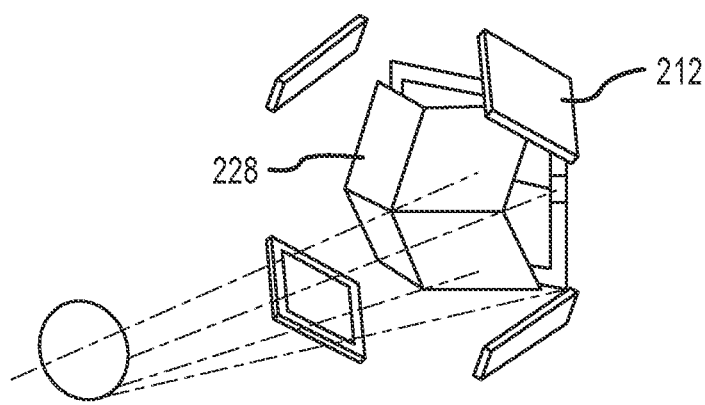

FIGS. 15A, 15B and 15C depict design considerations for a multiple component image imaging system 104 in accordance with embodiments of the present disclosure. FIG. 15A shows a single detector module 212 of outer dimension D. The inner region of size P marks the pitch at which detector elements or pixels are arrayed. There is an overlap region of size O/2 on either side of the inner region boundary (D=P+O). In FIG. 15B, four detectors are arrayed in overlapping fashion, on replication pitch P. The overlap region extends ±O/2 on either side of the boundary. This overlapping configuration represents the effective combination of the reflections of four detectors from four mirror facets. The facet tilt is in a direction away from the central axis, along a plane defined by the central axis and the center of the detector module. The edge of each mirror facet is delineated by the intersection of the mirror plane with the guide rays as shown. The rays that define the mirror corners are chief rays from the center of the exit pupil to the corners of the inner region P. For mirror corners not on a boundary, where the detector area can be used, the rays that define the outer boundaries are from the edge of the pupil to the edge of the full detector D. FIG. 15A shows the four physical detectors, located so that their virtual images form the desired continuous, overlapping focal plane. The example shown with four mirrors and four detectors, can be expanded to any N×M array of detector modules, which may be of uniform or differing sizes.

In accordance with further embodiments of the present disclosure, the imaging system 104 can be configured with a curved focal plane. Optical designs can be significantly more compact if a curved focal plane is allowed. Fabrication of detector modules with curved surface figures are possible, although costly. It is an advantage to be able to use a mosaic of relatively small detector modules with curved surfaces covering a portion of the field, rather than one large curved module. Without the use of curved detector modules, a mosaic of flat modules that piecewise approximate a curved focal plane, each spanning a limited field segment, can fall within acceptable focus limits.

Figure 16:
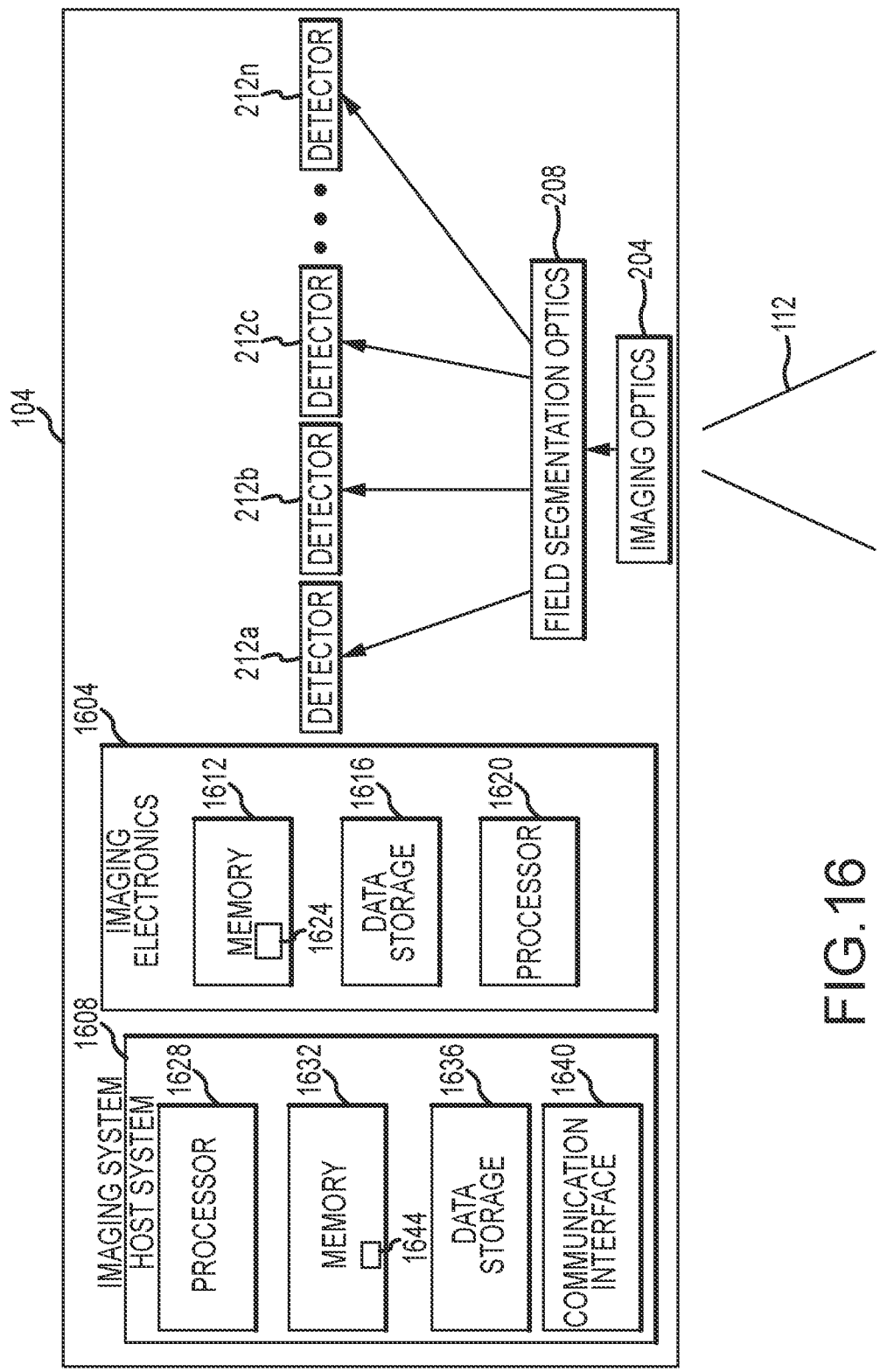
FIG. 16 is a block diagram depicting components of an imaging system in accordance with embodiments of the present disclosure.

FIG. 16 is a block diagram of an imaging system 104 in accordance with embodiments of the present disclosure. The imaging system 104 generally includes imaging optics 204, field segmentation optics 208, a plurality of detectors 212, imaging or focal plane electronics 1604, and host system electronics 1608. As also discussed elsewhere herein, the imaging optics 204 operate to collect light from within a field of view 112 of the imaging system 104, and focuses that light onto a focal plane. The imaging optics 204 can, for example, comprise a telescope. In accordance with at least some embodiments of the present disclosure, the imaging optics 204 can include various additional optical elements, including but not limited to filters, shutters, and apertures. Moreover, the imaging optics 204 can have a fixed or variable focal length.

The field segmentation optics 208 are located between the exit pupil 224 of the imaging optics 204 and the focal plane, and can include one or more mirrors, one or more multi-faceted prisms, or combinations of mirrors or prisms and open apertures or paths. The field segmentation optics 204 operate to divide the collected image information into multiple sub-images or component images, and further establish a set of component focal planes, with each sub-image focused on a different one of the component focal planes. Each of component image partially overlaps at least one other component image.

The plurality of detectors 212 include at least one detector 212 for each of the component images, and are located at the component focal planes. The detectors 212 can include a digital focal plane array or detector array 214. Accordingly, the detectors 212 can include detector arrays incorporating a plurality of pixels disposed in one or more rows and columns. As an example, but without limitation, each detector 212 in the plurality of detectors 212 can include a backside illuminated CMOS image sensor having a 1024× 1024 two-dimensional array of pixels. As can be appreciated by one of skill in the art after consideration of the present disclosure, in addition to a focal plane array formed from a plurality of photosensitive sites or pixels, the detectors 212 can incorporate or be associated with driver and analog-to-digital conversion (ADC) circuitry, enabling the detectors 212 to provide a digital output representative of an amplitude or intensity of light detected at each pixel within the detector array. In accordance with other embodiments of the present disclosure, the detectors 212 can be implemented as photographic films.

Each of the detectors 212 is operatively connected to the imaging electronics 1604. The imaging electronics 1604 generally include memory 1612, data storage 1616, and one or more processors 1620. The imaging electronics memory 1612 can include volatile or non-volatile solid-state memory, such as DRAM, SDRAM, or the like. The memory 1612 can provide short or long term storage for application or operating instructions 1624 that are executed by the processor 1620 to implement imaging operations or functions of the imaging system 104. The memory 1612 can also store image data, interim image data, configurable parameters, operating system instructions, intermediate data products, output data, and the like. In accordance with further embodiments of the present disclosure, the application instructions 1624 can include instructions for operating the detectors 212, performing image data fusion operations, and the like. The imaging electronics data storage 1616 generally includes non-volatile data storage, such as flash memory, solid-state drives, hard disk drives, optical disk drives, erasable programmable ROM, and the like. The data storage 1616 can provide short or long term storage for application instructions that are executed by the imaging electronics processor 1620, configurable parameters, intermediate data products, output data, and the like. The processor 1620 can include one or more multi-threaded processors, graphics processing units (GPUs), general purpose processors, field-programmable gate arrays, or the like. For example, the processor 1620 can be formed from a multi-threaded processor in combination with multiple GPUs. In accordance with further embodiments of the present disclosure, the processor 1620 can include a plurality of boards or cards, with each board including memory and a GPU or other processor.

Accordingly, the imaging electronics 1604 can provide control signals for operation of the detectors 212. As can be appreciated by one of skill in the art after consideration of the present disclosure, examples of control signals provided to the detectors 212 include signals enabling the conversion of incident light into electronic charge at some or all of the pixels, signals controlling integration times, signals controlling amplification levels, and the like. The operations performed by the imaging electronics 1604 can also include initiating and handling readout operations, including the temporary or long-term storage of component image information. The imaging electronics 1604 can additionally perform image fusing operations, in which component image information collected by the multiple detectors 212 is fused to create a composite image. Moreover, the composite image formed from the fusion of multiple component images is free from the effects of gaps present in typical systems incorporating multiple detectors to obtain image information.

The host system 1608 can include a processor 1628, memory 1632, data storage 1636, and a communications interface 1640. The processor 1628 can include a general purpose programmable processor or the like. The memory 1632 can include, for example, volatile or non-volatile memory, and can provide short or long-term storage for application programming or instructions, control parameters, intermediate data products, data, or the like. The memory 1632 can provide short or long term storage for application or operating instructions 1644 that are executed by the processor 1628 to implement imaging operations or functions of the imaging system 104. The memory 1632 can also store image data, interim image data, configurable parameters, operating instructions, intermediate data products, output data, and the like. In accordance with further embodiments of the present disclosure, the application instructions 1644 can include instructions for operating the detectors 212, performing image data fusion operations, operations associated with the operation of the platform 108, and the like. The data storage 1636 generally includes non-volatile storage for application programming or instructions, control parameters, intermediate data products, data, or the like. In addition to supporting the passing of commands to and the receiving of data from the imaging electronics 1604, the communications interface 1640 can support communications between the imaging system 104 and remote systems or communication nodes. Moreover, the communications system 1640 or other host system 1608 components can provide a user interface for a human operator.

In operation, the host system 1608 sends commands to the imaging electronics 1604. The imaging electronics 1604 in turn provide instructions to the detectors 212 that configure the detectors 212 appropriately, and that operates the detectors 212 to obtain component images 232 in accordance with the host system 1608 instructions. Moreover, the host system 1608 and/or the imaging electronics 1604, for example through execution of application programming 1624 or 1644, can operate to fuse component images 232 obtained by different detectors 212 into a composite image, where a composite image is an image that incorporates multiple component images. Moreover, the composite image can be a complete image, where a complete image encompasses all of the component images 232 received at all of the detectors 212 within the imaging system 104 during any one image integration period. For example, a complete image can encompass an entire area 116 within the field of view 112 of the imaging system 104. The host system 1608 can also perform functions related to operation of the platform 108 and/or the imaging system 104, including but not limited to: operations relating to the positioning of the platform 108; receiving and acting on instructions from a command center or user; transmitting component images collected by the imaging system 104; transmitting the results of image fusion performed by the imaging electronics 1604 or the host system 1608; and performing actions, including but not limited to actions concerning the positioning of the platform 108, autonomously and/or in response to commands received from a remote authority through the communication interface 1640.

Figure 17:
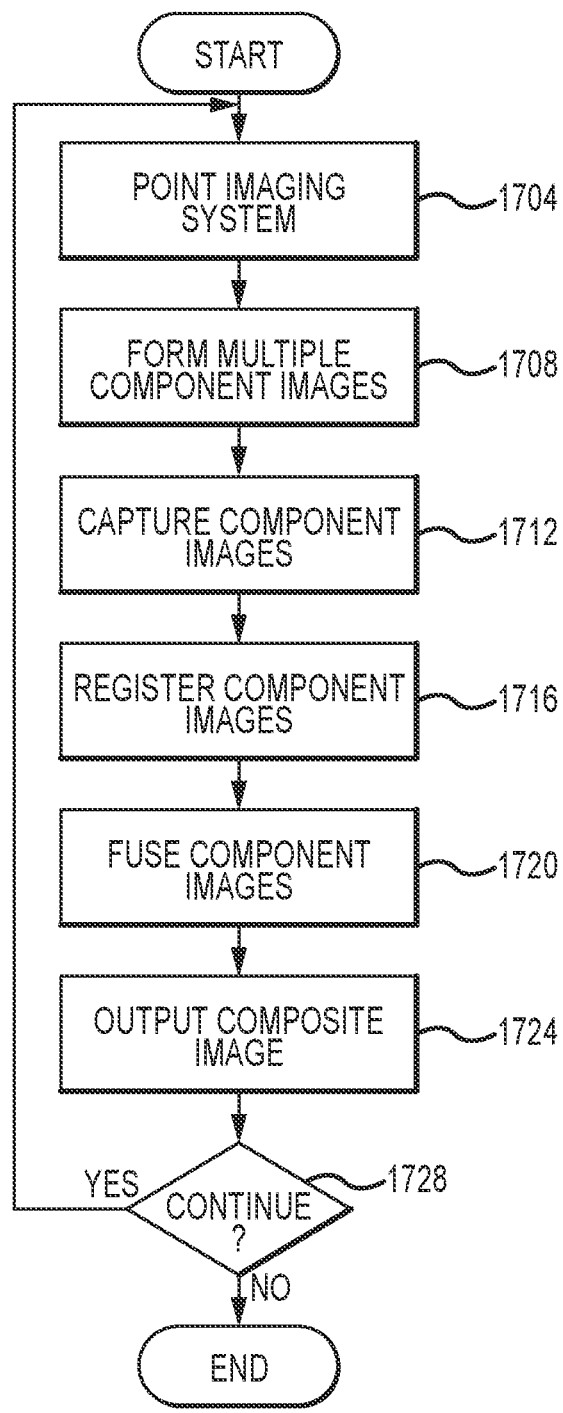
FIG. 17 is a flow chart depicting aspects of a method of forming a composite image from multiple component images in accordance with embodiments of the present disclosure.

FIG. 17 is a flow chart depicting aspects of a method of collecting a composite image formed from multiple component images 232 in accordance with embodiments of the present disclosure. The method includes collecting multiple overlapping component images 232 from a selected area 116 within a scene 120. In accordance with at least some operating modes of embodiments of the present disclosure, the component images 232 for inclusion in a particular composite image are all collected during the same integration period. In accordance with further operating modes of at least some embodiments of the present disclosure, the component images 232 included in a particular composite image are collected during overlapping integration periods. Initially, the method includes pointing an imaging system 104 so that a field of view 112 of the imaging system 104 encompasses a desired area 116 of a scene 120 (step 1704). Light from within the field of view 112 is divided into multiple component images 232 by field segmentation optics 208 located between the exit pupil 224 and the focal plane 216 of the imaging system 104 (step 1708). The different component images 232 are directed along different component optical paths, and imaged onto detectors 212 that are each located at the same focal distance from the exit pupil 224. Moreover, the different detectors 212 can be located on different component focal planes 216. The detectors 212 are then operated to capture the component images (step 1712), which may be configured such that all component images are captured simultaneously. For example, the electrical signals generated by arrays of pixels included in the detectors 212 are stored as representations of the component images.

The multiple component images are then combined to create a composite image. In particular, the stored component images obtained from the detectors 212 are registered (step 1716). Registering the component images can include aligning the component images 232 relative to one another, including the operations of reorienting the image data (horizontal and/or vertical flip), lateral shifting, rotation, and dimensional compression or expansion. Pre-processing of component images can also include scaling of the image brightness or color data to match signal levels between component images. The registered component images 232 can then be fused (step 1720). Fusing the component images 232 can include adding image data collected by detector pixels from within overlapping areas 128 within the imaged area 112. The resulting composite image can then be provided as an imaging system 104 output (step 1724). A determination can then be made as to whether operation of the imaging system 104 should continue (step 1728). If operation is to continue, the process can return to step 1604. Otherwise, the process can end.

In accordance with at least some embodiments of the present disclosure, the registration and fusion of the multiple image components to generate a composite image can be performed through the execution of application programming 1624 by the imaging electronics 1604 processor 1620 provided as part of the imaging system 104, and/or by the execution of application programming 1644 by the host system 1608 processor 1628. In accordance with further embodiments, some or all of the processing steps can be performed by a system that is separate from the imaging system 104.

In accordance with embodiments of the present invention, the process of combining component images 232 to obtain a composite image can be performed for all or selected portions of the imaged area 112. For example, processing time can be reduced by only processing the source pixels contributing signals that will eventually be displayed in a selected viewport or area within the larger imaged area 112, as opposed to combining all of the component images 232 and then extracting a viewport encompassing a selected portion of the larger imaged area 112. Alternatively or in addition, the image data included in the component images 232 can be combined using the entire available image resolution, or at a reduced resolution.

The foregoing discussion of the disclosed systems and methods has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described herein are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. An imaging system, comprising:
   imaging optics;
   field segmentation optics, wherein the field segmentation optics are located in an optical path defined at least in part by the imaging optics, between an exit pupil of the imaging optics and a focal plane of the imaging optics, and wherein the field segmentation optics define a plurality of component images; and
   a plurality of detectors, wherein at least one detector in the plurality of detectors is provided for each of the component images, and wherein a first component image in the plurality of component images encompasses a first sub-area of an area of a scene that at least partially overlaps a second sub-area of the area of the scene encompassed by a second component image in the plurality of component images.

2. The system of claim 1, wherein each of the component images is focused on a different component focal plane.

3. The system of claim 2, wherein each of the detectors within the plurality of detectors is located at a component focal plane of a corresponding component image.

4. The system of claim 1, wherein the field segmentation optics are closer to the focal plane of the imaging optics than to the exit pupil of the imaging optics.

5. The system of claim 4, wherein the field segmentation optics include at least one mirrored surface.

6. The system of claim 4, wherein the field segmentation optics include a plurality of mirrored surfaces.

7. The system of claim 4, wherein the field segmentation optics include a multi-faceted prism.

8. The system of claim 1, wherein each component image in the plurality of component images encompasses a different sub-area of the area of the scene, wherein the sub-area of the scene encompassed by any one of the component images at least partially overlaps a sub-area encompassed by at least one other component image in the plurality of component images.

9. The system of claim 1, wherein each detector in the plurality of detectors includes an array of pixels.

10. The system of claim 1, wherein each detector within the plurality of detectors is disposed on a different plane.

11. A method, comprising:
    collecting light from an image area;
    dividing the collected light into a plurality of component images, wherein each component image includes light collected from a different sub-area included in the image area, and wherein a first sub-area corresponding to a first one of the component images partially overlaps a second sub-area corresponding to a second one of the component images;
    focusing each component image in the plurality of component images on a corresponding one of a plurality of detectors, wherein at least one detector is provided for each component image in the plurality of component images; and
    fusing image information from a plurality of the component images to form a composite image, wherein fusing the component images includes registering the component images and adding pixel values from overlapping portions of the component images.

12. The method of claim 11, wherein collecting light from an image area includes collecting light from within a scene using imaging optics.

13. The method of claim 12, wherein dividing the collected light into a plurality of component images is performed using field segmentation optics located in an optical path between the imaging optics and the plurality of detectors.

14. The method of claim 13, wherein the field segmentation optics reflect the light in the optical path.

15. The method of claim 13, wherein the field segmentation optics refract the light in the optical path.

16. The method of claim 11, wherein at least some of the detectors in the plurality of detectors are located on different physical planes.

17. The method of claim 11, wherein each component image in the plurality of component images encompasses a sub-area that at least partially overlaps a sub-area of at least one other component image in the plurality of component images.

18. The method of claim 11, further comprising:
    outputting the composite image.

19. The method of claim 11, wherein the detectors are operable to provide the image information from the plurality of component images.

20. An imaging system, comprising:
    imaging optics;
    field segmentation optics, wherein the field segmentation optics are located in an optical path defined at least in part by the imaging optics, between an exit pupil of the imaging optics and a focal plane of the imaging optics, wherein the field segmentation optics define a plurality of partially overlapping component images, and wherein the field segmentation optics are located closer to the focal plane of the imaging optics than to the exit pupil of the imaging optics;

a plurality of detector arrays, wherein at least one detector array in the plurality of detector arrays is positioned at a focal plane of each of the component images; and imaging electronics, wherein the imaging electronics are operable to fuse a plurality of partially overlapping component images to form a composite image.

21. The system of claim 20, wherein each detector within the plurality of detectors is disposed on a different plane.

* * * * *